United States Patent
Karczewicz et al.

(10) Patent No.: US 9,877,029 B2
(45) Date of Patent: Jan. 23, 2018

(54) PALETTE INDEX BINARIZATION FOR PALETTE-BASED VIDEO CODING

(71) Applicant: QUALCOMM Incorporated, San Diego, CA (US)

(72) Inventors: Marta Karczewicz, San Diego, CA (US); Feng Zou, San Diego, CA (US); Rajan Laxman Joshi, San Diego, CA (US); Vadim Seregin, San Diego, CA (US); Wei Pu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 14/876,495

(22) Filed: Oct. 6, 2015

(65) Prior Publication Data
US 2016/0100171 A1   Apr. 7, 2016

Related U.S. Application Data

(60) Provisional application No. 62/061,088, filed on Oct. 7, 2014.

(51) Int. Cl.
| | |
|---|---|
| *H04N 11/02* | (2006.01) |
| *H04N 19/13* | (2014.01) |
| *H04N 19/176* | (2014.01) |
| *H04N 19/136* | (2014.01) |
| *H04N 19/70* | (2014.01) |
| *H04N 19/50* | (2014.01) |
| *H04N 19/14* | (2014.01) |
| *H04N 19/182* | (2014.01) |
| *H04N 19/593* | (2014.01) |

(52) U.S. Cl.
CPC ........... *H04N 19/13* (2014.11); *H04N 19/136* (2014.11); *H04N 19/14* (2014.11); *H04N 19/176* (2014.11); *H04N 19/182* (2014.11); *H04N 19/50* (2014.11); *H04N 19/70* (2014.11); *H04N 19/593* (2014.11)

(58) Field of Classification Search
CPC ....................................................... H04N 19/13
USPC ........................................ 375/240.01–240.29
See application file for complete search history.

(56) References Cited

U.S. PATENT DOCUMENTS 5,471,207 A    11/1995  Zandi et al.

OTHER PUBLICATIONS

Wiegand et al., "WD1: Working Draft 1 of High-Efficiency Video Coding", JCTVC-C403, 3rd Meeting: Guangzhou, ,CN, Oct. 7-15, 2010, 137 pp.

(Continued)

*Primary Examiner* — Leron Beck

(57) ABSTRACT

An example method of coding video data includes determining, for a current block of video data, a palette that includes a plurality of entries that each corresponds to a respective color value; determining a particular entry in the palette that is predicted to correspond to a color value of a current pixel of the current block; selecting a binarization from a plurality of binarizations; and coding, using the selected binarization, an index that indicates which entry in the palette corresponds to a color value for a current pixel of the current block, wherein coding the index using a first binarization of the plurality of binarizations comprises coding a syntax element that indicates whether the index is equal to the particular entry, and wherein coding the index using a second binarization of the plurality of binarizations comprises coding the index using a variable length code without coding the syntax element.

28 Claims, 10 Drawing Sheets

(56) References Cited

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Flynn, David et al., "High Efficiency Video Coding (HEVC) Range Extensions text specification: Draft 7", Joint Collaborative Team on Video Coding (JCT-VC) of ITU-T SG16 WP3 and ISO/IEC JTC1/SC 29/WG 11; 17th Meeting: Valencia, ES, Mar. 27 through Apr. 4, 2014, URL: http://phenix.int-evry.fr/jct/doc_end_user/documents/17_Valencia/wg11/JCTVC-Q1005-v4.zip.; 376 pp.
Pu W., et al., "Non-RCE4: Refinement of the palette in RCE4 Test 2", 16. JCT-VC Meeting; Jan. 9-17, 2014; San Jose; (Joint Collaborative Team on Video Coding of ISO/IEC JTC1/SC29/WG11 and ITU-T SG.I6); URL: http://wftp3.itu.int/av-arch/jctvc-site/, No. JCTVC-P0231-v5, Jan. 12, 2014, XP030115774, 4 pp.
Yang, Yu-Wen, et al., "Description of Core Experiment 6 (CE6): Improvements of palette mode", 18. JCT-VC Meeting, Jun. 30 through Jul. 9, 2014, Sapporo, JP; (Joint Collaborative Team on Video Coding (JCT-VC) of ITU-T SG16 WP3 and ISO/IEC JTC1/SC29/WG11); URL: http://wftp3.itu.int/av-arch/jctvc-site/, No. JCTVC-R1106, 6 pp.
Karczewiz, Marta, et al., "Non-CE6: Improved binarization and signaling of index coding for transition copy mode", 19. JCT-VC Meeting, Oct. 17th through 24th, 2014, Strasbourg, FR; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-S0178_r1, 3 pp.
Guo, Liwei, et al., "Non-RCE3: Modified Palette Mode for Screen Content Coding", 14. JCT-VC Meeting, Jul. 25 through Aug. 2, 2013, Vienna, AT; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-N0249, 6 pp.
Gisquet, C., et al., "AhG10: Transition copy mode for Palette mode", 17. JCT-VC Meeting, Mar. 27 through Apr. 4, 2014, Valencia, ES; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-Q0065, 5 pp.
Gisquet, C., et al., "SCCE3 Test B.6: transition prediction method", 18. JCT-VC Meeting, Jun. 30 through Jul. 9, 2014, Sapporo, JP; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-R0084, 6 pp.
Sun, Yu-Chen et al., "SCCE3 Test B.2: Transition copy mode", 18. JCT-VC Meeting, Jun. 30 through Jul. 9, 2014, Sapporo, JP; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-R0120-r1, 9 pp.
Joshi, Rajan, et al., "High Efficiency Video Coding (HEVC) Screen Content Coding: Draft 1", 18. JCT-VC Meeting, Jun. 30 through Jul. 9, 2014, Sapporo, JP; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-R1005-v3, 362 pp.
Guo, Xun, et al., "RCE4: Summary report of HEVC Range Extensions Core Experiments 4 (RCE4) on palette coding for screen content", 16. JCT-VC Meeting, Jan. 9 through 17, 2014, San Jose, US; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-P0035, 8 pp.
Joshi, Rajan, et al., "Screen content coding test model 2 (SCM 2)", 17. JCT-VC Meeting, Mar. 27 through Apr. 4, 2014, Valencia, ES; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-R1014, 10 pp.
Misra, Kiran, et al., "SCE2 Cross check report of test 2.2", 14. JCT-VC Meeting, Jul. 25 through Aug. 3, 2013, Vienna, AT;(Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-N0259, 2 pp.
Guo, Liwei et al., "Palette Mode for Screen Content Coding", 13. JCT-VC Meeting, Apr. 18 through 26, 2013, Incheon, KR; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-M0323, 12 pp.
International Search Report and Written Opinion from International Application PCT/US2015/054528, dated Mar. 29, 2016, 21 pp.
Lin T., et al., "AHG7: Full-Chroma (YUV444) Dictionary+Hybrid Dual-Coder Extension of HEVC", 11th Meeting, Shanghi, CN, Oct. 10 through 19, 2012 ; (Motion Picture Expert Group or ISO/IEC JTC1/SC29/WG11), JCTVC-K0133, Oct. 16, 2012, XP030054760, pp. 1-11.
Yu et al., "Common coditions for screen content coding tests, " 18th Meeting, Jun. 30-Jul. 9, 2014, Sapporo, JP; (Joint Collaborative Team on Video Coding (JCT-VC) of ITU-T SG 16 WP 3 and ISO/IEC JTC 1/SC 29/WG 11); JCTVC-R1015, Aug. 7, 2014, 5 pp.
Response to Written Opinion dated Mar. 29, 2016, from International Application No. PCT/US2015/054528, filed on Jul. 11, 2016, 4 pp.
Second Written Opinion from International Application No. PCT/US2015/054528, dated Nov. 4, 2016, 7 pp.
Response to Second Written Opinion dated Nov. 11, 2016, from International Application No. PCT/US2015/054528, dated Dec. 27, 2016, 3 pp.
International Preliminary Report on Patentability from International Application No. PCT/US2015/054528, dated Jan. 20, 2017, 8 pp.
Chen, et al., "Description of Screen Content Coding Technology Proposal by Qualcomm", JCT-VC Meeting, Valencia, (Joint Collaborative Team on Video Coding of ISO/IEC JTC1/SC29/WG11 and ITU-T SG.16), No. JCTVC-Q0031-v3, Mar. 28, 2014. XP030115916, 19 pp.

(56) References Cited

OTHER PUBLICATIONS

Huang, et al., "HEVC Screen Content Core Experiment 3 (SCCE3): Palette Mode", JCT-VC Meeting, Mar. 27-Apr. 1, 2014, Valencia, (Joint Collaborative Team on Video Coding of ISO/IECJTC1/SC29/WG11 and ITU-T SG.16 ), URL: http://wftp3.itu.int/av-arch/jctvc-site/, No. JCTVC-Q1123, Apr. 18, 2014, XP030116244., 11 pp.
Partial International Search Report from International Application No. PCT/US2015/054528, dated Jan. 4, 2016, 9 pp.

PALETTE INDEX BINARIZATION FOR PALETTE-BASED VIDEO CODING

This application claims the benefit of U.S. Provisional Application No. 62/061,088 filed Oct. 7, 2014, the entire content of which is incorporated herein by reference.

TECHNICAL FIELD

This disclosure relates to video encoding and decoding, and more specifically encoding and decoding using pallet-based coding techniques.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized ITU-T H.265, High Efficiency Video Coding (HEVC) standard, and the various HEVC extensions presently under development. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In one example, a method of coding video data includes determining, by a video coder and for a current block of video data, a palette that includes a plurality of entries that each correspond to a respective color value; determining, by the video coder, a particular entry in the palette that is predicted to correspond to a color value of a current pixel of the current block of video data; selecting, by the video coder, a binarization from a plurality of palette index binarizations; and coding, by the video coder and using the selected binarization, a palette index that indicates which entry in the palette corresponds to a color value for a current pixel of the current block of video data, wherein coding the palette index using a first binarization of the plurality of palette index binarizations comprises coding a syntax element that indicates whether the palette index is equal to the particular entry, and wherein coding the palette index using a second binarization of the plurality of palette index binarizations comprises coding the palette index using a variable length code without coding the syntax element.

In another example, a video coding device includes a memory configured to store video data, and one or more processors. In this example, the one or more processors are configured to determine, for a current block of video data, a palette that includes a plurality of entries that each correspond to a respective color value; determine a particular entry in the palette that is predicted to correspond to a color value of a current pixel of the current block of video data; select a binarization from a plurality of palette index binarizations; and code, using the selected binarization, a palette index that indicates which entry in the palette corresponds to a color value for a current pixel of the current block of video data. In this example, to code the palette index using a first binarization of the plurality of palette index binarizations, the one or more processors are configured to code a syntax element that indicates whether the palette index is equal to the particular entry. In this example, to code the palette index using a second binarization of the plurality of palette index binarizations, the one or more processors are configured to code the palette index using a variable length code without coding the syntax element.

In another example, a video coding device includes means for determining, for a current block of video data, a palette that includes a plurality of entries that each correspond to a respective color value; means for determining a particular entry in the palette that is predicted to correspond to a color value of a current pixel of the current block of video data; means for selecting a binarization from a plurality of palette index binarizations; and means for coding, using the selected binarization, a palette index that indicates which entry in the palette corresponds to a color value for a current pixel of the current block of video data, wherein the means for coding the palette index using a first binarization of the plurality of palette index binarizations comprise means for coding a syntax element that indicates whether the palette index is equal to the particular entry, and wherein the means for coding the palette index using a second binarization of the plurality of palette index binarizations comprise means for coding the palette index using a variable length code without coding the syntax element.

In another example, a computer-readable storage medium stores instructions that, when executed, cause one or more processors of a video coding device to determine, for a current block of video data, a palette that includes a plurality of entries that each correspond to a respective color value; determine a particular entry in the palette that is predicted to correspond to a color value of a current pixel of the current block of video data; select a binarization from a plurality of palette index binarizations; and code, using the selected binarization, a palette index that indicates which entry in the palette corresponds to a color value for a current pixel of the current block of video data, wherein the instructions that cause the one or more processors to code the palette index using a first binarization of the plurality of palette index binarizations comprise instructions that cause the one or more processors to code a syntax element that indicates whether the palette index is equal to the particular entry, and wherein the instructions that cause the one or more processors to code the palette index using a second binarization of the plurality of palette index binarizations comprise instructions that cause the one or more processors to code the palette index using a variable length code without coding the syntax element.

DETAILED DESCRIPTION

Figure 1:
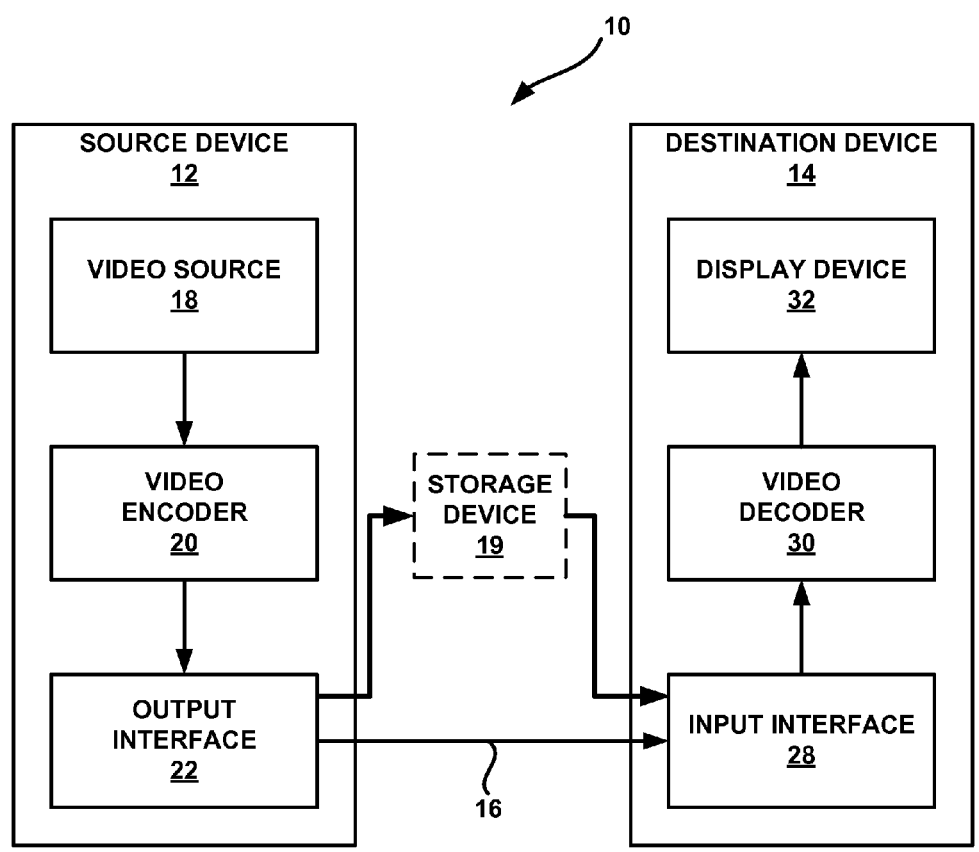
FIG. 1 is a block diagram illustrating an example video coding system that may utilize the techniques of this disclosure.

This disclosure includes techniques for video coding and compression. In particular, this disclosure describes techniques for palette-based coding of video data. For instance, this disclosure describes techniques to support coding of video content, especially screen content with palette coding, such as techniques for improved palette index binarization, and techniques for signaling for palette coding.

In traditional video coding, images are assumed to be continuous-tone and spatially smooth. Based on these assumptions, various tools have been developed such as block-based transform, filtering, and other tools that have shown good performance for natural content videos.

However, in applications like remote desktop, collaborative work and wireless display, computer generated screen content (e.g., such as text or computer graphics) may be the dominant content to be compressed. This type of content tends to have discrete-tone and feature sharp lines, and high contrast object boundaries. The assumption of continuous-tone and smoothness may no longer apply for screen content, and thus traditional video coding techniques may not be efficient ways to compress video data that includes screen content.

This disclosure describes palette-based coding, which may be particularly suitable for screen generated content coding. For example, assuming a particular area of video data has a relatively small number of colors. A video coder (a video encoder or video decoder) may code a so-called "palette" as a table of colors for representing the video data of the particular area (e.g., a given block). Each pixel may be associated with an entry in the palette that represents the color of the pixel. For example, the video coder may code an index that maps the pixel value to the appropriate entry in the palette. When the color of a pixel is not included in the palette, the pixel may be referred to as an escape pixel and the video coder may code data indicating a sample value for the pixel.

In the example above, a video encoder may encode a block of video data by determining a palette for the block (e.g., coding the palette explicitly, predicting it, or a combination thereof), locating an entry in the palette to represent the value of each pixel, and encoding the palette with index values for the pixels mapping the pixel value to the palette. A video decoder may obtain, from an encoded bitstream, a palette for a block, as well as index values for the pixels of the block. The video decoder may map the index values of the pixels to entries of the palette to reconstruct the pixel values of the block.

The example above is intended to provide a general description of palette-based coding. In various examples, the techniques described in this disclosure may include techniques for various combinations of one or more of signaling palette-based coding modes, transmitting palettes, predicting palettes, deriving palettes, and transmitting palette-based coding maps and other syntax elements. Such techniques may improve video coding efficiency, e.g., requiring fewer bits to represent screen generated content.

The techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

In some examples, the palette-based coding techniques may be configured for use with one or more video coding standards. For example, High Efficiency Video Coding (HEVC) is a new video coding standard developed by the Joint Collaboration Team on Video Coding (JCT-VC) of ITU-T Video Coding Experts Group (VCEG) and ISO/IEC Motion Picture Experts Group (MPEG). A recent HEVC text specification is described in Bross et al., "High Efficiency Video Coding (HEVC) Text Specification," ("HEVC Version 1"), available at: www.itu.int/rec/T-REC-H.265-201304-I.

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Aspects of this disclosure relate to coding index values that map pixels of a block to entries in a palette that each correspond to a respective color value. A video coder may code the index values of a map in a particular order, which may be referred to as a scan order or a scan direction. In some examples, the indices of a map may be scanned from top to bottom, left to right in what may be referred to as a raster scan order. In a raster scan order, the first index of a current line may be scanned directly after the last index of a previous line. In some examples, the indices of a map may be scanned in alternating directions for each line in what may be referred to as a snake scan order. In a snake scan order, the last index of a current line may be scanned directly after the last index of a previous line.

In some examples, a video coder may explicitly code a current index value from a map of index value. For instance, a video coder may code a value that indicates that the current index value is the second index value in a palette. In some examples, as opposed to explicitly coding a current index value, a video coder may code the current index value relative to one or more indices of the map. Several different techniques have been proposed to code index values of a map relative to other indices of the map. For instance, Guo et al., "RCE4: Summary report of HEVC Range Extensions Core Experiments 4 (RCE4) on palette coding for screen content," Document JCTVC-P0035, Joint Collaborative Team on Video Coding (JCT-VC) of ITU-T SG 16 WP 3 and ISO/IEC JTC 1/SC 29/WG 11, 16th Meeting: San José, US, 9-17 Jan. 2014, available at phenix.it-sudparis.eu/jct/doc_end_user/current_document.php?id=8765 (hereinafter, "JCTVC-P0035"), describes two methods of palette mode coding.

The first method described by JCTVC-P0035 to code indices of a map relative to one or more other indices of the map provides for three coding modes. For each pixel line, a flag may be signaled to indicate the coding mode. The first method may have three modes: horizontal mode, vertical mode, and normal mode. Additionally, if the pixel is classified as an escape pixel, the pixel value may be transmitted.

The second method described by JCTVC-P0035 to code indices of a map relative to one or more other indices of the map provides for the use of an entry-wise prediction scheme to code the current palette based on the palette of the left CU. The second method provides that the pixels in the CU are encoded in a raster scan order using three modes, a "Copy above mode," a "Run Mode," and a "Pixel mode."

As another example, Guo et al., "Non-RCE3: Modified Palette Mode for Screen Content Coding," Document JCTVC-N0249, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, available at phenix.it-sudparis.eu/jct/doc_end_user/current_document.php?id=7965 (hereinafter, "JCTVC-N0249"), describes additional methods of palette mode coding.

In JCTVC-NO249, the palette index coding modes are generalized to both copy from left (i.e., "run mode") and copy from above (i.e., "copy above mode") with run length coding. In "run mode," a video coder may first signal a palette index followed by "palette_run" (e.g., M). No further information may be coded for the current position and the following M positions as they have the same palette index as the signaled palette index. In "copy above mode," a video coder may code a value "copy_run" (e.g., N) to indicate that for the following N positions (including the current position), the palette index is equal to the palette index of the one that is at the same location in the row above.

As another example, SCM2.0, the second version of the reference software under development, available at https://hevc.hhi.fraunhofer.de/svn/svn_HEVCSoftware/tags/HM-15.0+RExt-8.0+SCM-2.0/, (hereinafter, "SCM2.0"), provides an "index mode" and a "copy from above" mode. In the "index mode" a video coder first signals a palette index. If the index is equal to the size of the palette, this indicates that the sample is an escape sample. In this case, the video coder signals the sample value or quantized samples value for each component. For example, if the palette size is 4, for non-escape samples, the palette indices are in the range [0, 3]. In this case, an index value of 4 may signify an escape sample. If the index indicates a non-escape sample, the video coder may signal a run-length, which may specify the number of subsequent samples in scanning order that share the same index, by a non-negative value n−1 indicating the run length, which means that the following n pixels including the current one have the same pixel index as the first signaled index. In the "copy from above" mode, the video coder only signals a non-negative run length value m−1 to indicate that for the following m pixels including the current pixel, palette indexes are the same as their neighbors directly above, respectively. Note that the copy from above" mode is different from the "index" mode, in the sense that the palette indices could be different within the "copy from above" run mode.

While the above-described prediction modes may be beneficial in that they may reduce the amount of data used to represent the index map, the modes may not be optimal in all situations. For instance, while the above-described modes may be well suited for strictly vertical or horizontal features, there are instances where palette-like content exhibits different behavior for which the above-described modes are not optimal. In particular, content may include transitions between pixel values. Gisquet et al., "AhG10: Transition copy mode for Palette mode," Document JCTVC-Q0065, Joint Collaborative Team on Video Coding (JCT-VC) of ITU-T SG 16 WP 3 and ISO/IEC JTC 1/SC 29/WG 11, 17th Meeting: Valencia, ES, 27 Mar.-4 Apr. 2014, available at phenix.it-sudparis.eu/jct/doc_end_user/current_document.php?id=8869 (hereinafter, "JCTVC-NO249"), describes an additional prediction mode, named "transition mode," that takes advantage of said transitions.

In the transition mode of palette-based coding, as a video coder codes indices of a map, the video coder may store information regarding transitions between index values and used the stored information to predict later index values. In some examples, the information stored by the video coder may be a table, referred to as a transition table, that includes the following index value for the last occurrence of a given index value. For example, the table may indicate that the last occurrence of index value five was followed by index value three. When coding a subsequent index value, the video coder may use the stored information to determine a predicted index value. For example, where a current index value is the index value following the next occurrence of index value five, the video coder may determine that the predicted index value for the current index value is index value three. However, as the predicted value may not be accurate (i.e., may not actually be the index value of the current index value), the video coder may also may code an indication of whether the predicted index value is accurate. If the current index value is not equal to the predicted index value, the video coder may code the current index value using truncated binary code. As one example, if the current index value is actually index value three, the video coder may code a flag that indicates that the predicted index value is accurate. As another example, if the current index value is index value four, the video coder may code a flag that indicates that the predicted index value is not accurate and code index value four using truncated binary code.

Where both a video encoder and a video decoder may utilize the same process to determine the predicted index values, use of the transition mode may reduce the amount of data needed to represent pixel values. However, in some examples, the binarization and signaling proposed for transition mode may not be efficient.

In accordance with one or more techniques of this disclosure, as opposed to using a single binarization for transition mode, a video coder may select a binarization from a plurality of binarizations to use for coding palette index values. As one example, when coding a palette index using a first binarization of the plurality of binarizations, a video coder may code a syntax element that indicates whether the palette index is equal to the predicted index value, and, where the palette index is not equal to the predicted index value, code the palette index using a variable length code. As another example, when coding a palette index using a second binarization of the plurality of binarizations, a video coder may code the palette index using a variable length code without coding a syntax element that indicates whether the palette index is equal to the predicted index value. Additionally, in both the first and second binarizations, the variable length code used by the video coder may be defined such that smaller index values have shorter codes than larger index values. For instance, in a palette that includes six entries (i.e., palette indices in the range of [0,5]), the variable length code that corresponds to the first entry (i.e., palette index value [0]) may be shorter than the variable length code that corresponds to the sixth entry (i.e., palette index value [5]). One example of such a variable length coding is truncated binary coding.

In some examples, a video coder may select the binarization based on a size of the palette. For instance, a video coder may determine a variable based on a size of the palette. In some examples, the variable may be the size of the palette. In some examples, the variable may be the size of the palette after one or more adjustments are performed (e.g., maxSymbol as described in SCM2.0). Further discussion of the adjustments is provided below. The video coder may select a binarization from a plurality of palette index binarizations based on whether the variable satisfies a predefined threshold. As one example, where the variable is greater than or equal to the predefined threshold, the video coder may select the first binarization. As another example, where the variable is less than the predefined threshold, the video coder may select the second binarization. As such, in some examples, when the variable is small (e.g., where the palette size is small), the video coder may code the index value using the second binarization. As stated above, when coding an index value using the second binarization, a video coder may code the index value using a variable length code without coding a syntax element that indicates whether the palette index is equal to the predicted index value. In this way, a video encoder may reduce the amount of data used to represent a palette index (i.e., by not coding a syntax element that indicates whether the palette index is equal to the predicted index value when the palette size is small).

Additionally, in some examples, the predicted index value may not be the first entry in the palette. In accordance with one or more techniques of this disclosure, a video coder may reorder the entries in a palette such that the predicted index value is the first entry in the palette. For instance, in a palette that includes six entries (i.e., palette indices in the range of [0,5]) with the fourth entry (i.e., palette index value [3]) being the predicted index value, the video coder may move the fourth entry to palette index value [0] and increment previous palette index values by one. As such, when the predicted index value is coded using variable length codes, the predicted index value will have the shortest possible code length. In this way, a video coder may reduce the amount of data used to represent a palette index.

Aspects of this disclose are related to adaptively enabling the usage of "transition mode." In previous transition mode encoding schemes, transition mode information for a current block is signaled regardless of the usage of transition mode for the current block. As such, the previous transition mode encoding schemes may not be efficient when the current block does not use transition mode.

In accordance with one or more techniques of this disclosure, a video coder may code, for a current block of video data, a syntax element that indicates whether transition mode is enabled for the current block. For instance, a video coder may code a flag (e.g., use_trans_flag) that indicates whether transition mode is enabled for the current block. In some examples, the video coder may code use_trans_flag as 1, where the current block uses the transition copy mode. In such examples, the video coder may signal transition mode information for the current block. In some examples, the video coder may code use_trans_flag as 0, where the current block does not use the transition copy mode. In such examples, the video coder may not signal transition mode information for the current block.

Aspects of this disclosure are related to signaling the copy mode. A video coder may signal an indication of which mode is used to code an index value. For instance, a video coder may signal a syntax element (e.g., palette_run_type_flag) that indicates whether index mode, copy above mode, or transition copy mode is used to code a current index value. In previous transition mode encoding schemes, such as the transition mode scheme described by the modes were signaled in accordance with Table 1, below. However, in some examples, the signaling scheme of Table 1 may not be efficient.

TABLE 1

| Symbol | Mode | Truncated Unary Codeword |
|---|---|---|
| 0 | Index mode (including escape using index coding) | 0 |
| 1 | Copy above mode | 10 |
| 2 | Transition copy mode | 11 |

In accordance with one or more techniques of this disclosure, a video encoder may use a signaling scheme that couples transition copy mode with index mode. For example, the modes may be signaled in accordance with Table 2, below.

TABLE 2

| Symbol | Mode | Truncated Unary Codeword |
|---|---|---|
| 0 | Index mode (including escape using index coding) | 00 |
| 1 | Transition copy mode | 01 |
| 2 | Copy above mode | 1 |

In such a scheme, in case copy above mode is not available (e.g. in the first row), only one bit may be needed to differentiate index mode and transition mode. In this way, a video coder may reduce the amount of data used to signal mode selection.

Aspects of this disclosure are related to transition table inheritance within pallet-based coding. As discussed above, a video coder may maintain a transition table that stores information used to determine predicted palette indices. In some examples, a video coder may inherit the transition table for a current block from a transition table for a previous block. Table inheritance may be a complex process for a video coder. As such, it may be desirable to not always inherit a transition table for a current block from a transition table for a previous block.

In accordance with one or more techniques of this disclosure, as opposed to always inheriting a transition table for a current block from a transition table for a previous block, a video coder may inheriting the transition table for the current block from the transition table for the previous block where palette sharing is enabled (i.e., where the video coder may predict a palette for the current block from a palette from another block). As one example, if the current block does not use palette sharing, transition table inheritance may be disabled and the video coder may reset the transition table to a default value. As another example, if the current block does use palette sharing, the video coder may inherit the transition table for the current block from the transition table for the previous block.

In some examples, transition table inheritance may be disabled when the current block is not in palette sharing mode and the current block's palette size is smaller than a threshold. The threshold may be either predefined or signalled.

In some examples, a video coder may code a syntax element that indicates whether transition table inheritance is used. The flag may be coded in a picture parameter set (PPS), sequence parameter set (SPS), video parameter set (VPS), a slice header, or elsewhere. This syntax element can be additionally signaled, or being coupled with a common flag which can be introduced and controls any inheritance or propagation in the palette mode from another blocks, for example palette predictor which includes palette entries from the previous coded blocks.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 19. Similarly, encoded data may be accessed from storage device 19 by input interface. Storage device 19 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 19 may correspond to a file server or another intermediate storage device that may hold the encoded video generated by source device 12. Destination device 14 may access stored video data from storage device 19 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 19 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 19 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 19, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized HEVC standard (and various extensions thereof presently under development). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more integrated circuits including microprocessors, digital signal processors (DSPs), application specific integrated circuits (ASICs), field programmable gate arrays (FPGAs), discrete logic, software, hardware, firmware, or any combinations thereof. When the techniques are implemented partially in software, a device may store instructions for the software in a suitable, non-transitory computer-readable medium and execute the instructions in hardware such as integrated circuitry using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a LCU. The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block.

Video decoder 30 may relate the index values of the pixels to entries of the palette to reconstruct the pixel values of the block.

Aspects of this disclosure are directed to palette derivation, which may occur at the encoder and at the decoder. As one example, video encoder 20 may derive a palette for a current block by deriving a histogram of the pixels in the current block. In some examples, the histogram may be expressed as $H=\{(v_i, f_i), i=\{0, 1, 2, \ldots, M\}\}$ where M+1 is the number of different pixel values in the current block, $v_i$ is pixel value, $f_i$ is the number of occurrence of $v_i$ (i.e., how many pixels in the current block have pixel value $v_i$). In such examples, the histogram generally represents a number of times that a pixel value occurs in the current block.

Video encoder 20 may initialize one or more variables when deriving the histogram. As one example, video encoder 20 may initialize a palette index idx to 0, (i.e., set idx=0). As another example, video encoder 20 may initialize the palette P to be empty (i.e., P=Ø, set j=0.).

Video encoder 20 may sort the histogram, e.g., in descending order, such that pixels having more occurrences are placed near the front of a list of values. For instance, video encoder 20 may sort H according to the descending order of $f_i$ and the ordered list may be expressed as $H_o=\{(u_i, f_i), i=\{0, 1, 2, \ldots, M\}, f_i \geq f_{i+1}\}$. In this example, the ordered list includes the most frequently occurring pixel values at the front (top) of the list and the least frequently occurring pixel values at the back (bottom) of the list.

Video encoder 20 may copy one or more entries from the histogram into the palette. As one example, video encoder 20 may insert the entry in the histogram with the greatest frequency into the palette. For instance, video encoder 20 may insert $(j, u_j)$ into the palette P (i.e., $P=P \cup \{(idx, u_j)\}$). In some examples, after inserting the entry into the palette, video encoder 20 may evaluate the entry in the histogram with the next greatest frequency for insertion into the palette. For instance, video encoder 20 may set idx=idx+1, j=j+1.

Video encoder 20 may determine whether the entry with the next greatest frequency (i.e., $u_{j+1}$) is within the neighborhood of any pixel (i.e., x) in the palette (i.e., Distance $(u_{j+1}, x)$<Thresh). For instance, video encoder 20 may determine whether the entry is within the neighborhood of any pixel in the palette by determining whether a value of the entry is within a threshold distance of a value of any pixel in the palette. In some examples, video encoder 20 may flexibly select the distance function. As one example, video encoder 20 may select the distance function as a sum of absolute differences (SAD) or a sum of squared errors of prediction (SSE) of the three color components (e.g., each of luminance, blue hue chrominance, and red hue chrominance), or one color component (e.g., one of luminance, blue hue chrominance, or red hue chrominance). In some examples, video encoder 20 may flexibly select the threshold value Thresh. As one example, video encoder 20 may select the threshold value to be dependent on the quantization parameter (QP) of the current block. As another example, video encoder 20 may select the threshold value to be dependent on the value of idx or the value of j.

If video encoder 20 determines that the entry with the next greatest frequency (i.e., $u_{j+1}$) is within the neighborhood of any pixel in the palette, video encoder 20 may not insert the entry in the histogram. If video encoder 20 determines that the entry with the next greatest frequency (i.e., $u_{j+1}$) is not within the neighborhood of any pixel in the palette, video encoder 20 may insert the entry in the histogram.

Video encoder 20 may continue to insert entries in the palette until one or more conditions are satisfied. Some example conditions are when idx=M, when j=M, or when the size of the palette is larger than a predefined value.

Palette-based coding may have a certain amount of signaling overhead. For example, a number of bits may be needed to signal characteristics of a palette, such as a size of the palette, as well as the palette itself. In addition, a number of bits may be needed to signal index values for the pixels of the block. The techniques of this disclosure may, in some examples, reduce the number of bits needed to signal such information. For example, the techniques described in this disclosure may include techniques for various combinations of one or more of signaling palette-based coding modes, transmitting palettes, predicting palettes, deriving palettes, and transmitting palette-based coding maps and other syntax elements.

In some examples, video encoder 20 and/or video decoder 30 may predict a palette using another palette. For example, video encoder 20 and/or video decoder 30 may determine a first palette having first entries indicating first pixel values. Video encoder 20 and/or video decoder 30 may then determine, based on the first entries of the first palette, one or more second entries indicating second pixel values of a second palette. Video encoder 20 and/or video decoder 30 may also code pixels of a block of video data using the second palette.

When determining the entries of the second palette based on the entries in the first palette, video encoder 20 may encode a variety of syntax elements, which may be used by video decoder to reconstruct the second palette. For example, video encoder 20 may encode one or more syntax elements in a bitstream to indicate that an entire palette (or palettes, in the case of each color component, e.g., Y, Cb, Cr, or Y, U, V, or R, G, B, of the video data having a separate palette) is copied from one or more neighboring blocks of the block currently being coded. The palette from which entries of the current palette of the current block are predicted (e.g., copied) may be referred to as a predictive palette. The predictive palette may contain palette entries from one or more neighboring blocks including spatially neighboring blocks and/or neighboring blocks in a particular scan order of the blocks. For example, the neighboring blocks may be spatially located to the left (left neighboring block) of or above (upper neighboring block) the block currently being coded. In another example, video encoder 20 may determine predictive palette entries using the most frequent sample values in a causal neighbor of the current block. In another example, the neighboring blocks may neighbor the block current being coded according to a particular scan order used to code the blocks. That is, the neighboring blocks may be one or more blocks coded prior to the current block in the scan order. Video encoder 20 may encode one or more syntax elements to indicate the location of the neighboring blocks from which the palette(s) are copied.

In some examples, palette prediction may be performed entry-wise. For example, video encoder 20 may encode one or more syntax elements to indicate, for each entry of a predictive palette, whether the palette entry is included in the palette for the current block. If video encoder 20 does not predict an entry of the palette for the current block, video encoder 20 may encode one or more additional syntax elements to specify the non-predicted entries, as well as the number of such entries.

The syntax elements described above may be referred to as a palette prediction vector. For example, as noted above, video encoder 20 and video decoder 30 may predict a palette for a current block based on one or more palettes from neighboring blocks (referred to collectively as a reference palette). When generating the reference palette, a first-in first-out (FIFO) may be used by adding the latest palette into the front of the queue. If the queue exceeds a predefined threshold, the oldest elements may be popped out. After pushing new elements into the front of the queue, a pruning process may be applied to remove duplicated elements, counting from the beginning of the queue. Specifically, in some examples, video encoder 20 may encode (and video decoder 30 may decode) a 0-1 vector to indicate whether the pixel values in the reference palette are reused for the current palette. As an example, as shown in the example of Table, below, a reference palette may include six items (e.g., six index values and respective pixel values).

TABLE 3

| Index | Pixel Value |
|---|---|
| 0 | $v_0$ |
| 1 | $v_1$ |
| 2 | $v_2$ |
| 3 | $v_3$ |
| 4 | $v_4$ |
| 5 | $v_5$ |

In an example for purposes of illustration, video encoder 20 may signal a vector (1, 0, 1, 1, 1, 1) that indicates that $v_0$, $v_2$, $v_3$, $v_4$, and $v_5$ are reused in the current palette, while $v_1$ is not re-used. In addition to reusing $v_0$, $v_2$, $v_3$, $v_4$, and $v_5$, video encoder 20 may add two new items to the current palette with indexes by 5 and 6. The current palette for this example is shown in Table 4, below.

TABLE 4

| Pred Flag | Index | Pixel Value |
|---|---|---|
| 1 | 0 | $v_0$ |
| 0 | | |
| 1 | 1 | $v_2$ |
| 1 | 2 | $v_3$ |
| 1 | 3 | $v_4$ |
| 1 | 4 | $v_5$ |
| | 5 | $u_0$ |
| | 6 | $u_1$ |

To code the palette prediction 0-1 vector, for each item in the vector, video encoder 20 may code one bit to represent its value and the bit may be coded using CABAC bypass. With respect to CABAC, as an example, a video coder (video encoder 20 or video decoder 30) may select a probability model (also referred to as a context model) to code symbols associated with a block of video data. For example, at the encoder, a target symbol may be coded by using the probability model. At the decoder, a target symbol may be parsed by using the probability model. In some instances, bins may be coded using a combination of context adaptive and non-context adaptive coding. For example, a video coder may use a bypass mode to bypass, or omit, the regular arithmetic coding context adaptation process for one or more bins, while using context adaptive coding for other bins. In such examples, the video coder may use a fixed probability model to bypass code the bins. That is, bypass coded bins do not include context or probability updates. In general, context coding bins may refer to coding the bins using a context coding mode. Likewise, bypass coding bins may refer to as coding the bins using a bypass coding mode.

However, due to the high correlation between palettes, the zero and one in the palette prediction vector may not be equally distributed, which may affect coding efficiency, e.g., because the 0-1 vector may not leverage the high correlation between palettes. Additionally, the number of palette items which cannot be predicted (e.g., the number of new palette entries (u0 and u1 in the example of Table 2 above)) may be binarized and signaled using unary code with each bit coded using CABAC bypass. Similar to the issues in palette prediction vector, modeling each bit in the unary code to have equal probability may be suboptimal, e.g., because, in practice, bits in the unary code may have different probabilities.

In some examples, video encoder 20 may code the palette prediction vector and/or the unary coded remaining palette size using CABAC with context(s), e.g., to improve coding efficiency relative to techniques that rely on bypass coding of such bins. In some examples, the items in the palette prediction vector can share a single CABAC context. In this way, the complexity may be reduced. In some examples, the unary code can use a single context. Also in this way, the complexity may be reduced.

In some examples, video encoder 20 may code the index values using fix length coding. In such examples, video encoder 20 may code each bit in the fix length code using CABAC bypass. However, in some cases, the number of indices in the palette may not be a power of two. In such cases, the codewords of the fix length code may not be fully utilized. For instance, if the palette size is 5, the indices will be 0, 1, 2, 3, and 4. To code each index with fix length code, video encoder 20 would have to use three bits. However, by using three bits, video encoder 20 may waste three codewords (8−5=3), which could affect coding efficiency. In some cases, a similar issue may occur when video encoder 20 codes escape pixels. In some examples, as opposed to using fixed length coding, video encoder 20 may utilize truncated binary code to code the index values and/or the escape pixels.

Other aspects of this disclosure relate to constructing and/or transmitting a map that allows video encoder 20 and/or video decoder 30 to determine pixel values. For example, other aspects of this disclosure relate constructing and/or transmitting a map of indices that relate a particular pixel to an entry of a palette.

In some examples, video encoder 20 may indicate whether pixels of a block have a corresponding value in a palette. In an example for purposes of illustration, assume that an (i, j) entry of a map corresponds to an (i, j) pixel position in a block of video data. In this example, video encoder 20 may encode a flag for each pixel position of a block. Video encoder 20 may set the flag equal to one for the (i, j) entry to indicate that the pixel value at the (i, j) location is one of the values in the palette. When a color is included in the palette (i.e., the flag is equal to one) video encoder 20 may also encode data indicating a palette index for the (i, j) entry that identifies the color in the palette. When the color of the pixel is not included in the palette (i.e., the flag is equal to zero) video encoder 20 may also encode data indicating a sample value for the pixel, which may be referred to as an escape pixel. Video decoder 30 may obtain the above-described data from an encoded bitstream and use the data to determine a palette index and/or pixel value for a particular location in a block.

In some instances, there may be a correlation between the palette index to which a pixel at a given position is mapped and the probability of a neighboring pixel being mapped to the same palette index. That is, when a pixel is mapped to a particular palette index, the probability may be relatively high that one or more neighboring pixels (in terms of spatial location) are mapped to the same palette index.

In some examples, video encoder 20 and/or video decoder 30 may determine and code one or more indices of a block of video data relative to one or more indices of the same block of video data. For example, video encoder 20 and/or video decoder 30 may be configured to determine a first index value associated with a first pixel in a block of video data, where the first index value relates a value of the first pixel to an entry of a palette. Video encoder 20 and/or video decoder 30 may also be configured to determine, based on the first index value, one or more second index values associated with one or more second pixels in the block of video data, and to code the first and the one or more second pixels of the block of video data. Thus, in this example, indices of a map may be coded relative to one or more other indices of the map.

As discussed above, video encoder 20 and/or video decoder 30 may use several different techniques to code index values of a map relative to other indices of the map. For instance, video encoder 20 and/or video decoder 30 may use index mode, copy above mode, and transition mode to code index values of a map relative to other indices of the map.

In the "index mode" of pallet-based coding, video encoder 20 and/or video decoder 30 may first signal a palette index. If the index is equal to the size of the palette, this indicates that the sample is an escape sample. In this case, video encoder 20 and/or video decoder 30 may signal the sample value or quantized samples value for each component. For example, if the palette size is 4, for non-escape samples, the palette indices are in the range [0, 3]. In this case, an index value of 4 may signify an escape sample. If the index indicates a non-escape sample, video encoder 20 and/or video decoder 30 may signal a run-length, which may specify the number of subsequent samples in scanning order that share the same index, by a non-negative value n−1 indicating the run length, which means that the following n pixels including the current one have the same pixel index as the first signaled index.

In the "copy from above" mode of pallet-based coding, video encoder 20 and/or video decoder 30 may signal a non-negative run length value m−1 to indicate that for the following m pixels including the current pixel, palette indexes are the same as their neighbors directly above, respectively. Note that the copy from above" mode is different from the "index" mode, in the sense that the palette indices could be different within the "copy from above" run mode.

In the transition mode of with pallet-based coding, as video encoder 20 and/or video decoder 30 codes indices of a map, video encoder 20 and/or video decoder 30 may store information regarding transitions between index values and used the stored information to predict later index values. In some examples, the information stored by video encoder 20 and/or video decoder 30 may be a table, referred to as a transition table, that includes the following index value for the last occurrence of a given index value. When coding a subsequent index value, video encoder 20 and/or video decoder 30 may use the stored information to determine a predicted index value. However, as the predicted value may not be accurate (i.e., may not actually be the index value of the current index value), video encoder 20 and/or video decoder 30 may also may code an indication of whether the predicted index value is accurate. If the current index value is not equal to the predicted index value, video encoder 20 and/or video decoder 30 may code the current index value using truncated binary code. Both video encoder 20 and video decoder 30 may utilize the same process to determine the predicted index values.

In accordance with one or more techniques of this disclosure, as opposed to using a single binarization for transition mode, video encoder 20 and/or video decoder 30 may select a binarization from a plurality of binarizations to use for coding palette index values. As one example, when coding a palette index using a first binarization of the plurality of binarizations, video encoder 20 and/or video decoder 30 may code a syntax element that indicates whether the palette index is equal to the predicted index value, and, where the palette index is not equal to the predicted index value, code the palette index using a variable length code. As another example, when coding a palette index using a second binarization of the plurality of binarizations, video encoder 20 and/or video decoder 30 may code the palette index using a variable length code without coding a syntax element that indicates whether the palette index is equal to the predicted index value. Additionally, in both the first and the second binarizations, the variable length code used by video encoder 20 and/or video decoder 30 may be defined such that smaller index values have shorter codes than larger index values. For instance, in a palette that includes six entries (i.e., palette indices in the range of [0,5]), the variable length code that corresponds to the first entry (i.e., palette index value [0]) may be shorter than the variable length code that corresponds to the sixth entry (i.e., palette index value [5]). One example of such a variable length coding is truncated binary coding.

In some examples, video encoder 20 and/or video decoder 30 may select the binarization based on a size of the palette. For instance, video encoder 20 and/or video decoder 30 may determine a variable based on a size of the palette. In some examples, the variable may be the size of the palette. In some examples, the variable may be the size of the palette after one or more adjustments are performed (e.g., maxSymbol as described in SCM2.0). Further discussion of the adjustments is provided below. Video encoder 20 and/or video decoder 30 may select a binarization from a plurality of palette index binarizations based on whether the variable satisfies a predefined threshold. As one example, where the variable is greater than or equal to the predefined threshold, video encoder 20 and/or video decoder 30 may select the first binarization. As another example, where the variable is less than the predefined threshold, video encoder 20 and/or video decoder 30 may select the second binarization. As such, in some examples, when the variable is small (e.g., where the palette size is small), the video coder may code the index value using the second binarization. As stated above, when coding an index value using the second binarization, video encoder 20 and/or video decoder 30 may code the index value using a variable length code without coding a syntax element that indicates whether the palette index is equal to the predicted index value. In this way, video encoder 20 and/or video decoder 30 may reduce the amount of data used to represent a palette index (i.e., by not coding a syntax element that indicates whether the palette index is equal to the predicted index value when the palette size is small).

Figure 2:
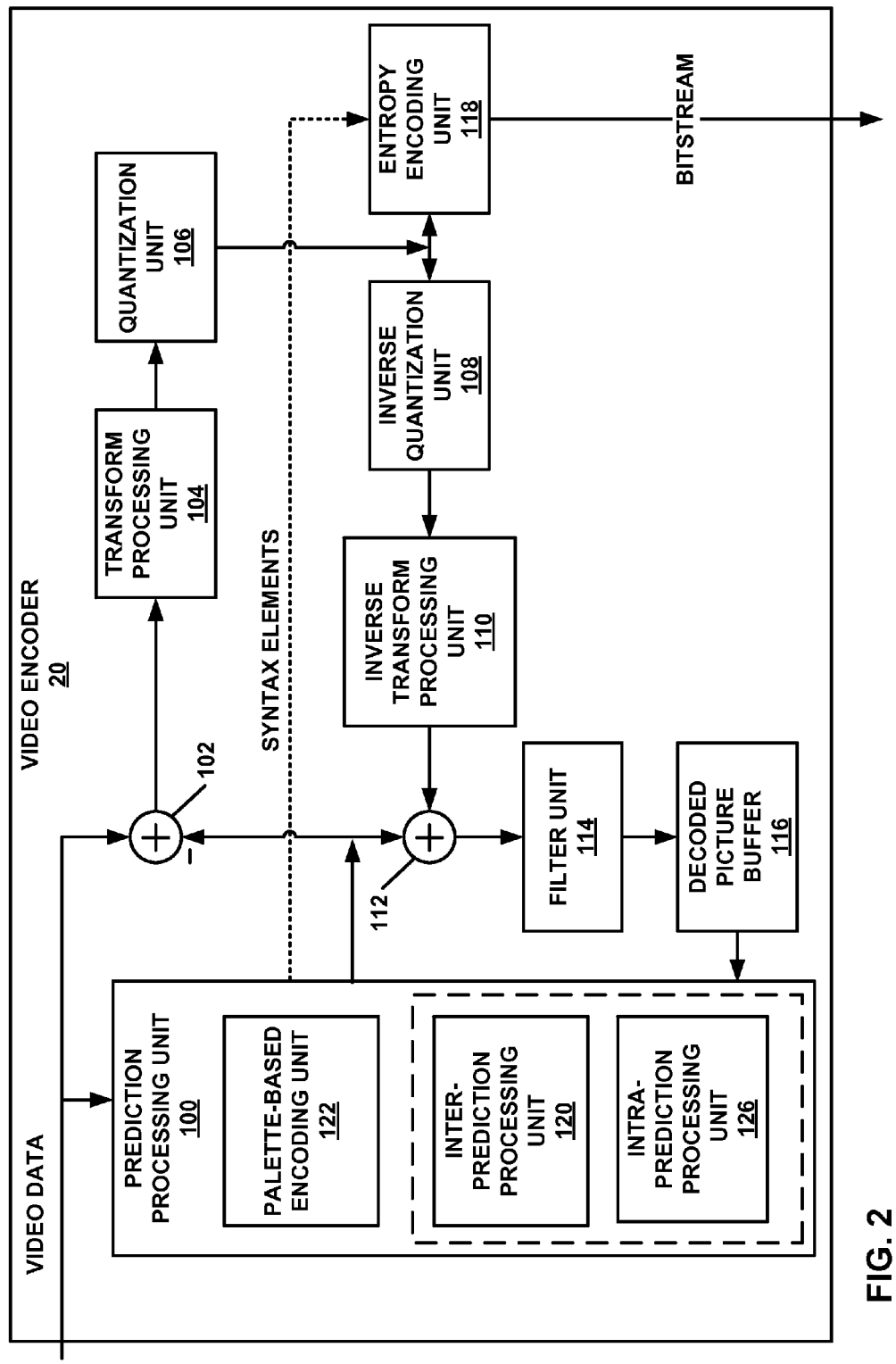
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CU's or PU's in HEVC coding, using either palette-based coding or non-palette based coding. Non-palette based coding modes may refer to various inter-predictive temporal coding modes or intra-predictive spatial coding modes, such as the various coding modes specified by HEVC Draft 10. Video encoder 20, in one example, may be configured to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. The signaled information may be used by video decoder 30 to decode video data.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive sample blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive sample blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. The motion compensation unit of inter-prediction processing unit 120 may generate the predictive sample blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive sample blocks of the PU based at least in part on actual or interpolated samples at the reference region indicated by the motion vector of the PU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based encoding when a palette-based encoding mode is selected, e.g., for a CU or PU. For example, palette-based encoding unit 122 may be configured to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

Palette-based encoding unit 122 may encode the palette index values using a plurality of modes. For instance, palette-based encoding unit 122 may use index mode, copy above mode, and transition mode to code index values relative to other indices. When using transition mode, palette-based encoding unit 122 may determine, for a current pixel of a current block of video data, a particular entry in a palette that is predicted to correspond to a color value of the current pixel. In some examples, the particular entry may be referred to as the prediction index, the most-probable-mode (MPM), or the transition prediction index. As discussed above, palette-based encoding unit 122 may determine the particular entry based on a transition table.

In some examples, palette-based encoding unit 122 may perform a pruning operation to generate an adjusted palette when encoding a palette index value for a current pixel of a current block. To generate the adjusted palette for the current pixel, palette-based encoding unit 122 may remove one or more entries from the palette for the current block that cannot be the palette index value for the current pixel. Further details of one example of a pruning operation are discussed below with reference to FIG. 6. In any case, by removing one or more entries from the palette for the current block, palette-based encoding unit 122 may reduce the range of possible indices which may be signaled for the current block. In this way, palette-based encoding unit 122 may reduce the amount of data used to signal the palette index for the current block.

Palette-based encoding unit 122 may binarize (i.e., create a binary representation of) the palette index value for the current pixel of the current block. In some examples, palette-based encoding unit 122 may use a single binarization for all palette indices coded using the transition mode. For example, palette-based encoding unit 122 may encode a flag that indicates whether the palette index value for the current pixel is equal to the prediction index (i.e., the particular entry in the palette that is predicted to correspond to a color value of the current pixel). If the palette index value for the current pixel is not equal to the prediction index, palette-based encoding unit 122 may perform a second pruning operation by removing the prediction index from the palette for the current pixel and encode the palette index value for the current pixel among the remaining possible indices using truncated binary code. However, in some examples, it may not be desirable to use a single binarization for all palette indices coded using the transition mode.

In accordance with one or more techniques of this disclosure, as opposed to using a single binarization to encode the palette index of the current pixel of the current block, palette-based encoding unit 122 may select a binarization from a plurality of palette index binarizations based on one or more characteristics of the palette. For instance, palette-based encoding unit 122 may determine a variable based on a size of the palette, and compare the variable to a predefined threshold.

In some examples, the variable may be the size of the palette. In some examples, the variable may be the size of the palette after one or more adjustments are performed (e.g., maxSymbol as described in SCM2.0), such as the pruning process mentioned above and discussed below with reference to FIG. 6. In some examples, palette-based encoding unit 122 may encode the predefined threshold in one or more of: a slice level, a picture level, or a sequence level. In some examples, the predefined threshold may be a constant known by palette-based encoding unit 122.

In some examples, palette-based encoding unit 122 may select the binarization from the plurality of palette index binarizations based on whether the variable satisfies the predefined threshold. As one example, where the variable is greater than or equal to the predefined threshold, palette-based encoding unit 122 may select a first binarization from the plurality of palette index binarizations and encode the palette index using the first binarization. As another example, where the variable is less than the predefined threshold, palette-based encoding unit 122 may select a second binarization from the plurality of palette index binarizations and encode the palette index using the second binarization.

To encode the palette index using the first binarization of the plurality of palette index binarizations, palette-based encoding unit 122 may code a syntax element that indicates whether the palette index is equal to the prediction index. If the palette index value is not equal to the prediction index, palette-based encoding unit 122 may perform a second pruning operation by removing the prediction index from the palette for the current pixel and encode the palette index value for the current pixel among the remaining possible indices using a fixed length code. To encode the palette index using the second binarization of the plurality of palette index binarizations, palette-based encoding unit 122 may code the palette index using a variable length code without coding a syntax element that indicates whether the palette index is equal to the prediction index. Some fixed length codes which palette-based encoding unit 122 may use to encode the palette index include, but are not necessarily limited to, truncated binary code, truncated unary, or truncated Golomb code, other variants of Golomb code family, or any other variable length codes.

In some examples, palette-based encoding unit 122 may encode a flag that indicates the selected binarization. For instance, palette-based encoding unit 122 may encode a flag that indicates the selected binarization at the CU level. In some examples, instead of using two different binarizations, palette-based encoding unit 122 may use three or more binarizations and signal the choice explicitly using a syntax element (instead of a flag).

As discussed above, where the palette index value is not equal to the prediction index, palette-based encoding unit 122 may perform a second pruning operation by removing the prediction index from the palette for the current pixel and encode the palette index value for the current pixel among the remaining possible indices. Further details of one example of a prediction index removal operation are discussed below with reference to FIG. 8. By removing the prediction index from the palette for the current block, palette-based encoding unit 122 may reduce the range of possible indices which may be signaled for the current block. In this way, palette-based encoding unit 122 may reduce the amount of data used to signal the palette index for the current block.

Additionally, in some examples, the predicted index value may not be the first entry in the palette. In accordance with one or more techniques of this disclosure, palette-based encoding unit 122 may reorder the entries in a palette such that the predicted index value is the first entry in the palette (i.e., such that a value of the particular entry is less than values of other entries in the palette). For instance, in a palette that includes six entries (i.e., palette indices in the range of [0,5]) with the fourth entry (i.e., palette index value [3]) being the predicted index value, palette-based encoding unit 122 may move the fourth entry to palette index value [0] and increment previous palette index values that are less than the predicted index value by one. As such, when the predicted index value is encoded using variable length codes, the predicted index value will have the shortest possible code length. In this way, palette-based encoding unit 122 may reduce the amount of data used to represent a palette index. Further details of one example of a palette entry reorder operation are discussed below with reference to FIG. 7.

In some examples, palette-based encoding unit 122 may signal an indication of which mode is used to code an index value. For instance, palette-based encoding unit 122 may signal a syntax element (e.g., palette_run_type_flag) that indicates whether index mode, copy above mode, or transition copy mode is used to code a current index value. In previous transition mode encoding schemes, such as the transition mode scheme described by the modes were signaled in accordance with Table 1, above. However, in some examples, the signaling scheme of Table 1 may not be efficient.

In accordance with one or more techniques of this disclosure, palette-based encoding unit 122 may use a signaling scheme that couples transition copy mode with index mode. For example, the modes may be signaled in accordance with Table 2, above. Palette-based encoding unit 122 may cause entropy encoding unit 118 to context code or partially context code and partially bypass code the bins in Table 2. As one example, palette-based encoding unit 122 may cause entropy encoding unit 118 to partially context code and partially bypass code the bins from Table 2 as shown in Table 5, below. As shown in Table 5, entropy encoding unit 118 may context code the first bin and bypass code the second bin. In some examples, the context used by entropy encoding unit 118 may depend on the above pixel mode (index mode, or transition copy mode, or copy above mode). For example, if the above pixel is transition copy mode or index mode (including escape mode), entropy encoding unit 118 may use context 0 to code the first bin; otherwise (the above pixel is copy above mode), entropy encoding unit 118 may use context 1 to code the first bin.

TABLE 5

| Symbol | Mode | 1$^{st}$ Bin Context Coded | 2$^{nd}$ Bin Bypass Coded |
|---|---|---|---|
| 0 | Index mode (including escape using index coding) | 0 | |
| 1 | Transition copy mode | 0 | 1 |
| 2 | Copy above mode | 1 | N/A |

In some examples, palette-based encoding unit 122 may context code both bins and the context may depend on palette size. For instance, palette-based encoding unit 122 may cause entropy encoding unit 118 to context code the bins from Table 2 as shown in Table 6, below. The context used by entropy encoding unit 118 to code the first bin in Table 6 may depend on the neighboring pixel mode, while context used by entropy encoding unit 118 to code the second bin may depend on the palette size. Specifically, for the first bin, entropy encoding unit 118 may apply similar context modeling as the one mentioned above. For the second bin, if the current block palette size is smaller than a threshold (8 for instance), entropy encoding unit 118 may use one context, otherwise, entropy encoding unit 118 may use the other context to code the second bin.

TABLE 6

| Symbol | Mode | 1$^{st}$ Bin Context Coded | 2$^{nd}$ Bin Context Coded |
|---|---|---|---|
| 0 | Index mode (including escape using index coding) | 0 | |
| 1 | Transition copy mode | 0 | 1 |
| 2 | Copy above mode | 1 | N/A |

In some examples, entropy encoding unit 118 may infer the transition mode for any redundant mode signaling existed in the palette. For example, when the left and above palette indices are the same and not escape, the palette mode cannot be a copy from above mode, or when the above pixel is the escape the copy from above mode cannot be used, not available copy from above mode in the first row, and similar. In such cases, entropy encoding unit 118 may signal the "not used" or "not allowed" mode, but transition mode may be used or inferred instead. In this case, the extra bin signaling indicating the transition mode may not be needed.

In previous transition mode encoding schemes, transition mode information for a current block is signaled regardless of the usage of transition mode for the current block. As such, the previous transition mode encoding schemes may not be efficient when the current block does not use transition mode.

In accordance with one or more techniques of this disclosure, palette-based encoding unit 122 may code, for a current block of video data, a syntax element that indicates whether transition mode is enabled for the current block. For instance, palette-based encoding unit 122 may code a flag (e.g., use_trans_flag) that indicates whether transition mode is enabled for the current block. In some examples, palette-based encoding unit 122 may code use_trans_flag as 1, where the current block uses the transition copy mode. In such examples, palette-based encoding unit 122 may signal transition mode information for the current block. In some examples, palette-based encoding unit 122 may code use_trans_flag as 0, where the current block does not use the transition copy mode. In such examples, palette-based encoding unit 122 may not signal transition mode information for the current block and palette-based encoding unit 122 may use traditional signaling (as done in SCM2.0) to code the palette index. In this way, palette-based encoding unit 122 may reduce the overhead cost associated with signaling the transition modes for those blocks that do not use transition mode.

In some examples, palette-based encoding unit 122 may cause entropy encoding unit 118 to context code use_trans_flag with one context or multiple contexts, which may depend on neighboring block's use_trans_$_{flag}$ value. As one example, entropy encoding unit 118 may use a first context (e.g., Context 0) where neither of the left or top neighboring blocks use transition copy mode. As another example, entropy encoding unit 118 may use a second context (e.g., Context 1) where either the left or top neighboring blocks uses transition copy mode. As another example, entropy encoding unit 118 may use a third context (e.g., Context 2) where both the left and the top neighboring blocks use transition copy mode.

Palette-based encoding unit 122 may be configured to generate any of the various syntax elements described herein. Accordingly, video encoder 20 may be configured to encode blocks of video data using palette-based code modes as described in this disclosure. Video encoder 20 may selectively encode a block of video data using a palette coding mode, or encode a block of video data using a different mode, e.g., such an HEVC inter-predictive or intra-predictive coding mode. The block of video data may be, for example, a CU or PU generated according to an HEVC coding process. A video encoder 20 may encode some blocks with inter-predictive temporal prediction or intra-predictive spatial coding modes and decode other blocks with the palette-based coding mode.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra-prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In some examples, residual coding is not performed with palette coding. Accordingly, video encoder 20 may not perform transformation or quantization when coding using a palette coding mode. In addition, video encoder 20 may entropy encode data generated using a palette coding mode separately from residual data.

Figure 3:
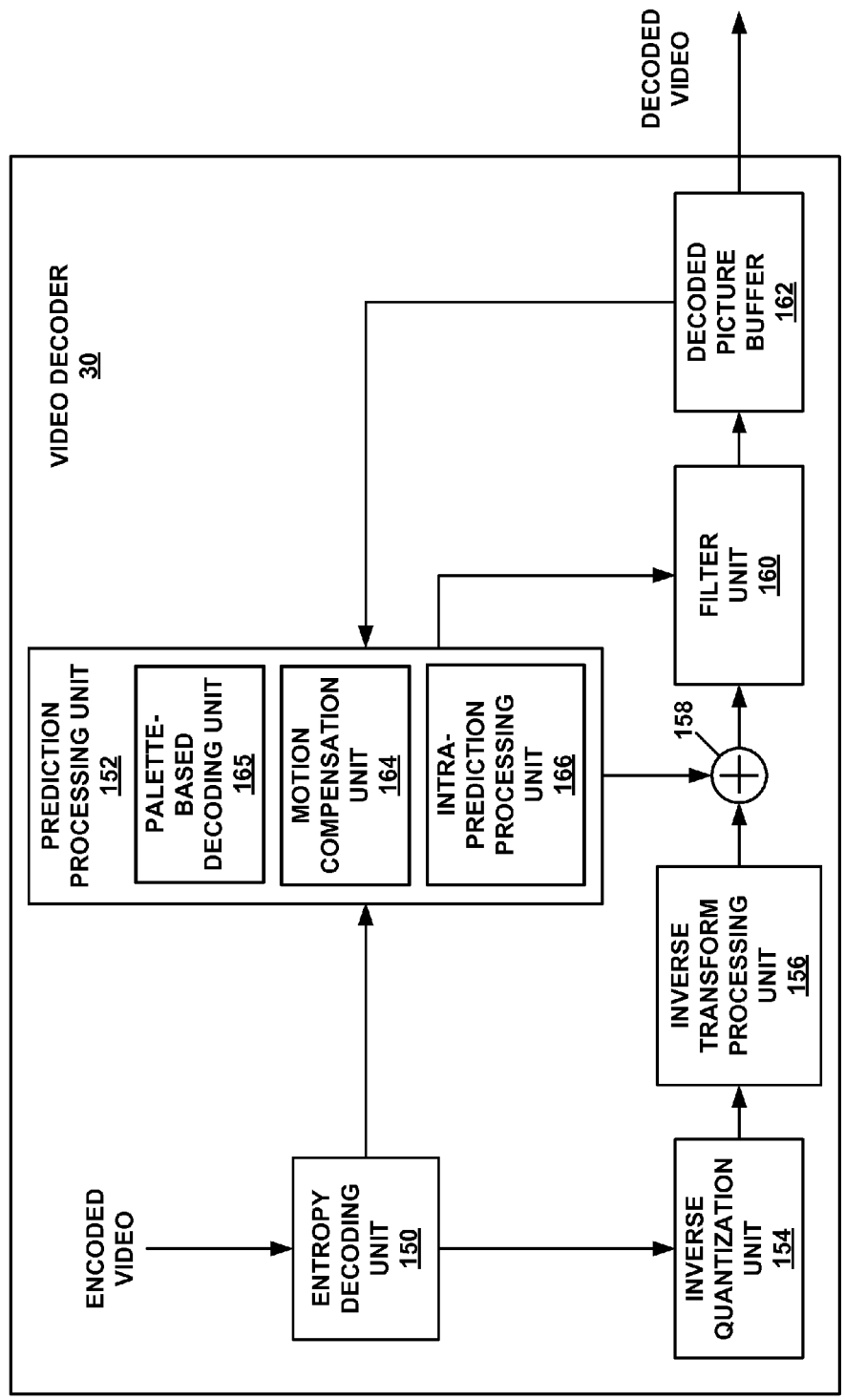
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques for palette-based video coding in accordance with various examples described in this disclosure. For example, video decoder 30 may be configured to selectively decode various blocks of video data, such as CU's or PU's in HEVC coding, using either palette-based coding or non-palette based coding. Non-palette based coding modes may refer to various inter-predictive temporal coding modes or intra-predictive spatial coding modes, such as the various coding modes specified by HEVC Draft 10. Video decoder 30, in one example, may be configured to generate a palette having entries indicating pixel values, receive information associating at least some positions of a block of video data with entries in the palette, select pixel values in the palette based on the information, and reconstruct pixel values of the block based on the selected pixel values.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra-prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configure to generate a palette having entries indicating pixel values, receive information associating at least some positions of a block of video data with entries in the palette, select pixel values in the palette based on the information, and reconstruct pixel values of the block based on the selected pixel values. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, palette-based decoding unit 165 decodes the block of video data using a non-palette based coding mode, e.g., such an HEVC inter-predictive or intra-predictive coding mode, when the palette coding mode information indicates that the palette coding mode does not apply to the block. The block of video data may be, for example, a CU or PU generated according to an HEVC coding process. A video decoder 30 may decode some blocks with inter-predictive temporal prediction or intra-predictive spatial coding modes and decode other blocks with the palette-based coding mode. The palette-based coding mode may comprise one of a plurality of different palette-based coding modes, or there may be a single palette-based coding mode.

The palette coding mode information received by palette-based decoding unit 165 may comprise a palette mode syntax element, such as a flag. A first value of the palette mode syntax element indicates that the palette coding mode applies to the block and a second value of the palette mode syntax element indicates that the palette coding mode does not apply to the block of video data. Palette-based decoding unit 165 may receive the palette coding mode information at one or more of a predictive unit level, a coding unit level, a slice level, or a picture level, or may receive the palette coding mode information in at least one of picture parameter set (PPS), sequence parameter set (SPS) or video parameter set (VPS).

In some examples, palette-based decoding unit 165 may infer the palette coding mode information based on one or more of a size of the coding block, a frame type, a color space, a color component, a frame size, a frame rate, a layer id in scalable video coding or a view id in multi-view coding associated with the block of video data.

Palette-based decoding unit 165 also may be configured to receive information defining at least some of the entries in the palette with video data, and generate the palette based at least in part on the received information. The size of the palette may be fixed or variable. In some cases, the size of the palette is variable and is adjustable based on information signaled with the video data. The signaled information may specify whether an entry in the palette is a last entry in the palette. Also, in some cases, the palette may have a maximum size.

The palette may be a single palette including entries indicating pixel values for a luma component and chroma components of the block. In this case, each entry in the palette is a triple entry indicating pixel values for the luma component and two chroma components. Alternatively, the palette comprises a luma palette including entries indicating pixel values of a luma component of the block, and chroma palettes including entries indicating pixel values for respective chroma components of the block.

In some examples, palette-based decoding unit 165 may generate the palette by predicting the entries in the palette based on previously processed data. The previously processed data may include palettes, or information from palettes, for previously decoded neighboring blocks. Palette-based decoding unit 165 may receive a prediction syntax element indicating whether the entries in the palette are to be predicted. The prediction syntax element may include a plurality of prediction syntax elements indicating, respectively, whether entries in palettes for luma and chroma components are to be predicted.

Palette-based decoding unit 165 may, in some examples, predict at least some of the entries in the palette based on entries in a palette for a left neighbor block or a top neighbor block in a slice or picture. In this case, the entries in the palette that are predicted based on entries in either a palette for the left neighbor block or the top neighbor block may be predicted by palette-based decoding unit 165 based on a syntax element that indicates selection of the left neighbor block or the top neighbor block for prediction. The syntax element may be a flag having a value that indicates selection of the left neighbor block or the top neighbor block for prediction.

In some examples, palette-based decoding unit 165 may receive one or more prediction syntax elements that indicate whether at least some selected entries in the palette, on an entry-by-entry basis, are to be predicted, and generate the entries accordingly. Palette-based decoding unit 165 may predict some of the entries and receive information directly specifying other entries in the palette.

Palette-based decoding unit 165 may generate the palette in part by receiving pixel values for one or more positions of the block, and adding the pixel values to entries in the palette to dynamically generate at least a portion the palette on-the-fly. Adding the pixel values may comprise adding the pixel values to an initial palette comprising an initial set of entries, or to an empty palette that does not include an initial set of entries. In some examples, adding comprises adding the pixel values to add new entries to an initial palette comprising an initial set of entries initial or fill existing entries in the initial palette, or replacing or changing pixel values of entries in the initial palette.

In some examples, the palette may be a quantized palette in which a pixel value selected from the palette for one of the positions in the block is different from an actual pixel value of the position in the block, such that the decoding process is lossy. For example, the same pixel value may be selected from the palette for two different positions having different actual pixel values.

Information, received by palette-based decoding unit 165, associating at least some positions of a block of video data with entries in the palette may comprise map information including palette index values for at least some of the positions in the block, wherein each of the palette index values corresponds to one of the entries in the palette. The map information may include one or more run syntax elements that each indicate a number of consecutive positions in the block having the same palette index value.

Palette-based decoding unit 165 may decode the palette index values using a plurality of modes. For instance, palette-based decoding unit 165 may use index mode, copy above mode, and transition mode to code index values relative to other indices. When using transition mode, palette-based decoding unit 165 may determine, for a current pixel of a current block of video data, a particular entry in a palette that is predicted to correspond to a color value of the current pixel. In some examples, the particular entry may be referred to as the prediction index, the most-probable-mode (MPM), or the transition prediction index. As discussed above, palette-based decoding unit 165 may determine the particular entry based on a transition table.

In some examples, palette-based decoding unit 165 may perform a pruning operation to generate an adjusted palette when encoding a palette index value for a current pixel of a current block. To generate the adjusted palette for the current pixel, palette-based decoding unit 165 may remove one or more entries from the palette for the current block that cannot be the palette index value for the current pixel. Further details of one example of a pruning operation are discussed below with reference to FIG. 6. In any case, by removing one or more entries from the palette for the current block, palette-based decoding unit 165 may reduce the range of possible indices which may be signaled for the current block. In this way, palette-based decoding unit 165 may reduce the amount of data used to signal the palette index for the current block.

Palette-based decoding unit 165 may de-binarize (i.e., reconstruct from a binary representation) the palette index value for the current pixel of the current block. In some examples, palette-based decoding unit 165 may use a single binarization for all palette indices coded using the transition mode. For example, palette-based decoding unit 165 may decode a flag that indicates whether the palette index value for the current pixel is equal to the prediction index (i.e., the particular entry in the palette that is predicted to correspond to a color value of the current pixel). If the palette index value for the current pixel is not equal to the prediction index, palette-based decoding unit 165 may perform a second pruning operation by removing the prediction index from the palette for the current pixel and decode the palette index value for the current pixel among the remaining possible indices using truncated binary code. However, in some examples, it may not be desirable to use a single binarization for all palette indices coded using the transition mode.

In accordance with one or more techniques of this disclosure, as opposed to using a single binarization to encode the palette index of the current pixel of the current block, palette-based decoding unit 165 may select a binarization from a plurality of palette index binarizations based on one or more characteristics of the palette. For instance, palette-based decoding unit 165 may determine a variable based on a size of the palette, and compare the variable to a predefined threshold.

In some examples, palette-based decoding unit 165 may select the binarization from the plurality of palette index binarizations based on whether the variable satisfies the predefined threshold. As one example, where the variable is greater than or equal to the predefined threshold, palette-based decoding unit 165 may select a first binarization from the plurality of palette index binarizations and decode the palette index using the first binarization. As another example, where the variable is less than the predefined threshold, palette-based decoding unit 165 may select a second binarization from the plurality of palette index binarizations and decode the palette index using the second binarization.

To decode the palette index using the first binarization of the plurality of palette index binarizations, palette-based decoding unit 165 may decode a syntax element that indicates whether the palette index is equal to the prediction index. If the palette index value is not equal to the prediction index, palette-based decoding unit 165 may perform a second pruning operation by removing the prediction index from the palette for the current pixel and decode the palette index value for the current pixel among the remaining possible indices using a fixed length code. To decode the palette index using the second binarization of the plurality of palette index binarizations, palette-based decoding unit 165 may decode the palette index using a variable length code without decoding a syntax element that indicates whether the palette index is equal to the prediction index. Some fixed length codes which palette-based decoding unit 165 may use to encode the palette index include, but are not necessarily limited to, truncated binary code, truncated unary, or truncated Golomb code, other variants of Golomb code family, or any other variable length codes.

As discussed above, where the palette index value is not equal to the prediction index, palette-based decoding unit 165 may perform a second pruning operation by removing the prediction index from the palette for the current pixel and decode the palette index value for the current pixel among the remaining possible indices. Further details of one example of a prediction index removal operation are discussed below with reference to FIG. 8. By removing the prediction index from the palette for the current block, palette-based decoding unit 165 may reduce the range of possible indices which may be signaled for the current block. In this way, palette-based decoding unit 165 may reduce the amount of data used to signal the palette index for the current block.

Additionally, in some examples, the predicted index value may not be the first entry in the palette. In accordance with one or more techniques of this disclosure, palette-based decoding unit 165 may reorder the entries in a palette such that the predicted index value is the first entry in the palette (i.e., such that a value of the particular entry is less than values of other entries in the palette). For instance, in a palette that includes six entries (i.e., palette indices in the range of [0,5]) with the fourth entry (i.e., palette index value [3]) being the predicted index value, palette-based encoding unit 122 may move the fourth entry to palette index value [0] and increment previous palette index values by one. As such, when the predicted index value is decoded using variable length codes, the predicted index value will have the shortest possible code length. In this way, palette-based decoding unit 165 may reduce the amount of data used to represent a palette index. Further details of one example of a palette entry reorder operation are discussed below with reference to FIG. 7.

In some examples, palette-based decoding unit 165 may receive an indication of which mode is used to code an index value. For instance, palette-based decoding unit 165 may decode a syntax element (e.g., palette_run_type_flag) that indicates whether index mode, copy above mode, or transition copy mode is used to code a current index value. In previous transition mode encoding schemes, such as the transition mode scheme described by the modes were signaled in accordance with Table 1, above. However, in some examples, the signaling scheme of Table 1 may not be efficient.

In accordance with one or more techniques of this disclosure, palette-based decoding unit 165 may use a signaling scheme that couples transition copy mode with index mode. For example, the modes may be signaled in accordance with Table 2, above. Palette-based decoding unit 165 may cause entropy decoding unit 150 to context code or partially context code and partially bypass code the bins in Table 2. As one example, palette-based decoding unit 165 may cause entropy decoding unit 150 to partially context code and partially bypass code the bins from Table 2 as shown in Table 5, above. As shown in Table 5, entropy decoding unit 150 may context code the first bin and bypass code the second bin. In some examples, the context used by entropy decoding unit 150 may depend on the above pixel mode (index mode, or transition copy mode, or copy above mode). For example, if the above pixel is transition copy mode or index mode (including escape mode), entropy decoding unit 150 may use context 0 to code the first bin; otherwise (the above pixel is copy above mode), entropy decoding unit 150 may use context 1 to code the first bin.

In some examples, palette-based decoding unit 165 may context code both bins and the context may depend on palette size. For instance, palette-based decoding unit 165 may cause entropy decoding unit 150 to context code the bins from Table 2 as shown in Table 6, above. The context used by entropy decoding unit 150 to code the first bin in Table 6 may depend on the neighboring pixel mode, while context used by entropy decoding unit 150 to code the second bin may depend on the palette size. Specifically, for the first bin, entropy decoding unit 150 may apply similar context modeling as the one mentioned above. For the second bin, if the current block palette size is smaller than a threshold (8 for instance), entropy decoding unit 150 may use one context, otherwise, entropy decoding unit 150 may use the other context to code the second bin.

In some examples, entropy decoding unit 150 may infer the transition mode for any redundant mode signaling existed in the palette. For example, when the left and above palette indices are the same and not escape, the palette mode cannot be a copy from above mode, or when the above pixel is the escape the copy from above mode cannot be used, not available copy from above mode in the first row, and similar.

In such cases, entropy decoding unit 150 may signal the "not used" or "not allowed" mode, but transition mode may be used or inferred instead. In this case, the extra bin signaling indicating the transition mode may not be needed.

In previous transition mode encoding schemes, transition mode information for a current block is signaled regardless of the usage of transition mode for the current block. As such, the previous transition mode encoding schemes may not be efficient when the current block does not use transition mode.

In accordance with one or more techniques of this disclosure, palette-based decoding unit 165 may code, for a current block of video data, a syntax element that indicates whether transition mode is enabled for the current block. For instance, palette-based decoding unit 165 may code a flag (e.g., use_trans_flag) that indicates whether transition mode is enabled for the current block. In some examples, palette-based decoding unit 165 may code use_trans_flag as 1, where the current block uses the transition copy mode. In such examples, palette-based encoding unit 122 may signal transition mode information for the current block. In some examples, palette-based decoding unit 165 may code use_trans_flag as 0, where the current block does not use the transition copy mode. In such examples, palette-based decoding unit 165 may not signal transition mode information for the current block and palette-based decoding unit 165 may use traditional signaling (as done in SCM2.0) to code the palette index. In this way, palette-based decoding unit 165 may reduce the overhead cost associated with signaling the transition modes for those blocks that do not use transition mode.

In some examples, palette-based decoding unit 165 may cause entropy decoding unit 150 to context code use_trans_flag with one context or multiple contexts, which may depend on neighboring block's use_trans_flag value. As one example, entropy decoding unit 150 may use a first context (e.g., Context 0) where neither of the left or top neighboring blocks use transition copy mode. As another example, entropy decoding unit 150 may use a second context (e.g., Context 1) where either the left or top neighboring blocks uses transition copy mode. As another example, entropy decoding unit 150 may use a third context (e.g., Context 2) where both the left and the top neighboring blocks use transition copy mode.

Figure 4:
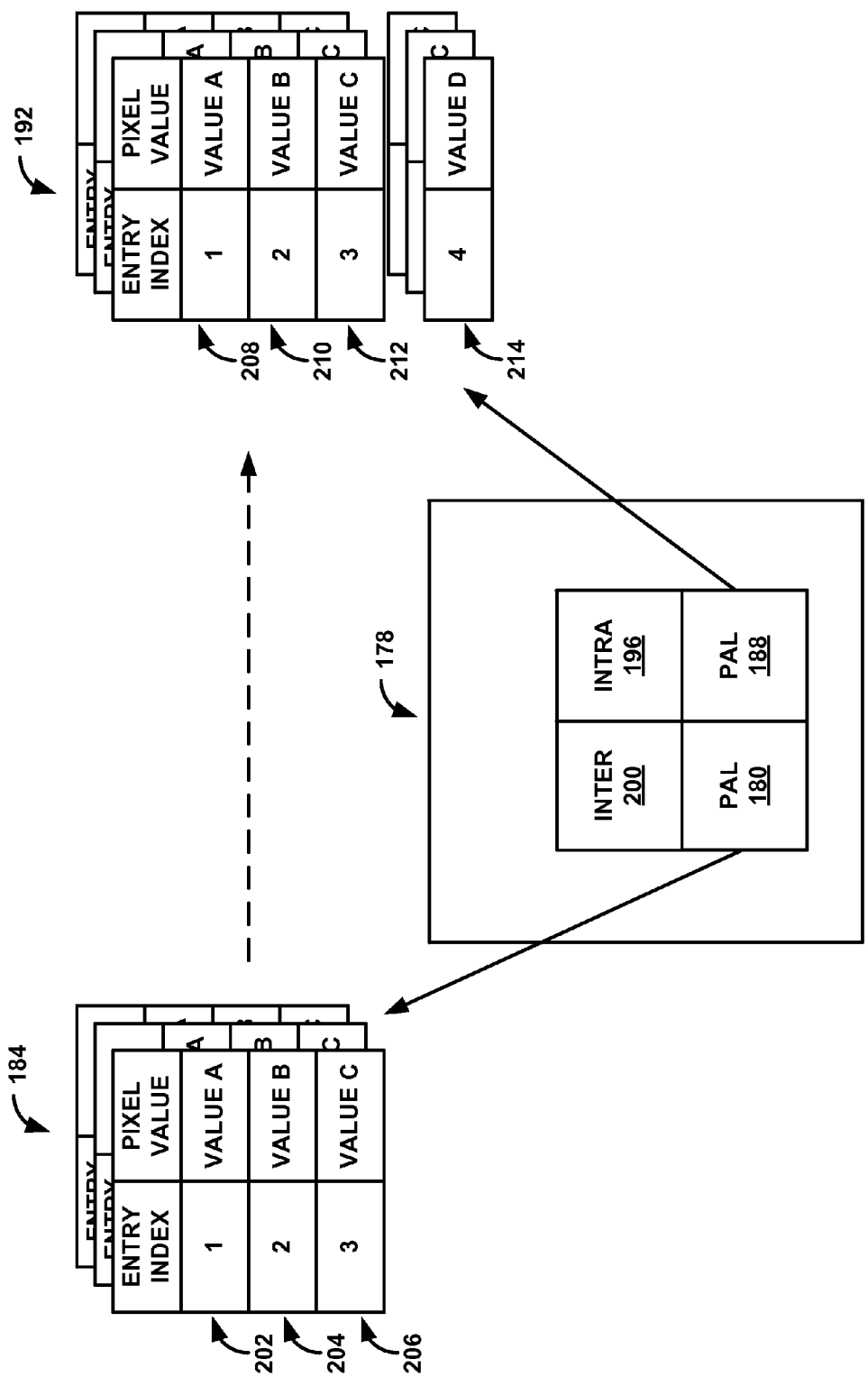
FIG. 4 is a conceptual diagram illustrating an example of determining a palette for coding video data, consistent with techniques of this disclosure.

FIG. 4 is a conceptual diagram illustrating an example of determining a palette for coding video data, consistent with techniques of this disclosure. The example of FIG. 4 includes a picture 178 having a first coding unit (CU) 180 that is associated with first palettes 184 and a second CU 188 that is associated with second palettes 192. As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 4 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 188 in the example of FIG. 4. First palettes 184 and second palettes 192 are shown as including multiple palettes. In some examples, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU. In another example, video encoder 20 may encode a palette for luma (Y) component of a CU, another palette for two components (U, V) of the CU. In this example, entries of the Y palette may represent Y values of pixels of the CU, entries of the U-V palette may represent U-V value pairs of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of palettes 184 and 192 as a set of palettes having multiple individual palettes is merely one example and not intended to be limiting.

In the example of FIG. 4, first palettes 184 includes three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding. In general, one or more palettes may be transmitted for each CU or may be shared among different CUs.

Video encoder 20 and video decoder 30 may determine second palettes 192 based on first palettes 184. For example, video encoder 20 may encode a pred_palette_flag for each CU (including, as an example, second CU 188) to indicate whether the palette for the CU is predicted from one or more palettes associated with one or more other CUs, such as neighboring CUs (spatially or based on scan order) or the most frequent samples of a causal neighbor. For example, when the value of such a flag is equal to one, video decoder 30 may determine that second palettes 192 for second CU 188 are predicted from one or more already decoded palettes and therefore no new palettes for second CU 188 are included in a bitstream containing the pred_palette_flag. When such a flag is equal to zero, video decoder 30 may determine that palette 192 for second CU 188 is included in the bitstream as a new palette. In some examples, pred_palette_flag may be separately coded for each different color component of a CU (e.g., three flags, one for Y, one for U, and one for V, for a CU in YUV video). In other examples, a single pred_palette_flag may be coded for all color components of a CU.

In the example above, the pred_palette_flag is signaled per-CU to indicate whether any of the entries of the palette for the current block are predicted. In some examples, one or more syntax elements may be signaled on a per-entry basis. That is a flag may be signaled for each entry of a palette predictor to indicate whether that entry is present in the current palette. As noted above, if a palette entry is not predicted, the palette entry may be explicitly signaled.

When determining second palettes 192 relative to first palettes 184 (e.g., pred_palette_flag is equal to one), video encoder 20 and/or video decoder 30 may locate one or more blocks from which the predictive palettes, in this example first palettes 184, are determined. The predictive palettes may be associated with one or more neighboring CUs of the CU currently being coded (e.g., such as neighboring CUs (spatially or based on scan order) or the most frequent samples of a causal neighbor), i.e., second CU 188. The palettes of the one or more neighboring CUs may be associated with a predictor palette. In some examples, such as the example illustrated in FIG. 4, video encoder 20 and/or video decoder 30 may locate a left neighboring CU, first CU 180, when determining a predictive palette for second CU 188. In other examples, video encoder 20 and/or video decoder 30 may locate one or more CUs in other positions relative to second CU 188, such as an upper CU, CU 196.

Video encoder 20 and/or video decoder 30 may determine a CU for palette prediction based on a hierarchy. For example, video encoder 20 and/or video decoder 30 may initially identify the left neighboring CU, first CU 180, for palette prediction. If the left neighboring CU is not available for prediction (e.g., the left neighboring CU is coded with a mode other than a palette-based coding mode, such as an intra-prediction more or intra-prediction mode, or is located at the left-most edge of a picture or slice) video encoder 20 and/or video decoder 30 may identify the upper neighboring CU, CU 196. Video encoder 20 and/or video decoder 30 may continue searching for an available CU according to a predetermined order of locations until locating a CU having a palette available for palette prediction. In some examples, video encoder 20 and/or video decoder 30 may determine a predictive palette based on multiple blocks and/or reconstructed samples of a neighboring block.

While the example of FIG. 4 illustrates first palettes 184 as predictive palettes from a single CU, first CU 180, in other examples, video encoder 20 and/or video decoder 30 may locate palettes for prediction from a combination of neighboring CUs. For example, video encoder 20 and/or video decoder may apply one or more formulas, functions, rules or the like to generate a palette based on palettes of one or a combination of a plurality of neighboring CUs.

In still other examples, video encoder 20 and/or video decoder 30 may construct a candidate list including a number of potential candidates for palette prediction. A pruning process may be applied at both video encoder 20 and video decoder 30 to remove duplicated candidates in the list. In such examples, video encoder 20 may encode an index to the candidate list to indicate the candidate CU in the list from which the current CU used for palette prediction is selected (e.g., copies the palette). Video decoder 30 may construct the candidate list in the same manner, decode the index, and use the decoded index to select the palette of the corresponding CU for use with the current CU.

In an example for purposes of illustration, video encoder 20 and video decoder 30 may construct a candidate list that includes one CU that is positioned above the CU currently being coded and one CU that is positioned to the left of the CU currently being coded. In this example, video encoder 20 may encode one or more syntax elements to indicate the candidate selection. For example, video encoder 20 may encode a flag having a value of zero to indicate that the palette for the current CU is copied from the CU positioned to the left of the current CU. Video encoder 20 may encode the flag having a value of one to indicate that the palette for the current CU is copied from the CU positioned above the current CU. Video decoder 30 decodes the flag and selects the appropriate CU for palette prediction.

In still other examples, video encoder 20 and/or video decoder 30 determine the palette for the CU currently being coded based on the frequency with which sample values included in one or more other palettes occur in one or more neighboring CUs. For example, video encoder 20 and/or video decoder 30 may track the colors associated with the most frequently used index values during coding of a predetermined number of CUs. Video encoder 20 and/or video decoder 30 may include the most frequently used colors in the palette for the CU currently being coded.

In some examples, video encoder 20 and/or video decoder 30 may perform entry-wise based palette prediction. For example, video encoder 20 may encode one or more syntax elements, such as one or more flags, for each entry of a predictive palette indicating whether the respective predictive palette entries are reused in the current palette (e.g., whether pixel values in a palette of another CU are reused by the current palette). In this example, video encoder 20 may encode a flag having a value equal to one for a given entry when the entry is a predicted value from a predictive palette (e.g., a corresponding entry of a palette associated with a neighboring CU). Video encoder 20 may encode a flag having a value equal to zero for a particular entry to indicate that the particular entry is not predicted from a palette of another CU. In this example, video encoder 20 may also encode additional data indicating the value of the non-predicted palette entry.

In the example of FIG. 4, second palettes 192 includes four entries 208-214 having entry index value 1, entry index value 2, entry index value 3, and entry index 4, respectively. Entries 208-214 relate the index values to pixel values including pixel value A, pixel value B, pixel value C, and pixel value D, respectively. Video encoder 20 and/or video decoder 30 may use any of the above-described techniques to locate first CU 180 for purposes of palette prediction and copy entries 1-3 of first palettes 184 to entries 1-3 of second palettes 192 for coding second CU 188. In this way, video encoder 20 and/or video decoder 30 may determine second palettes 192 based on first palettes 184. In addition, video encoder 20 and/or video decoder 30 may code data for entry 4 to be included with second palettes 192. Such information may include the number of palette entries not predicted from a predictor palette and the pixel values corresponding to those palette entries.

In some examples, according to aspects of this disclosure, one or more syntax elements may indicate whether palettes, such as second palettes 192, are predicted entirely from a predictive palette (shown in FIG. 4 as first palettes 184, but which may be composed of entries from one or more blocks) or whether particular entries of second palettes 192 are predicted. For example, an initial syntax element may indicate whether all of the entries are predicted. If the initial syntax element indicates that not all of the entries are predicted (e.g., a flag having a value of 0), one or more additional syntax elements may indicate which entries of second palettes 192 are predicted from the predictive palette.

According to some aspects of this disclosure, certain information associated with palette prediction may be inferred from one or more characteristics of the data being coded. That is, rather than video encoder 20 encoding syntax elements (and video decoder 30 decoding such syntax elements) video encoder 20 and video decoder 30 may perform palette prediction based on one or more characteristics of the data being coded.

Figure 5:
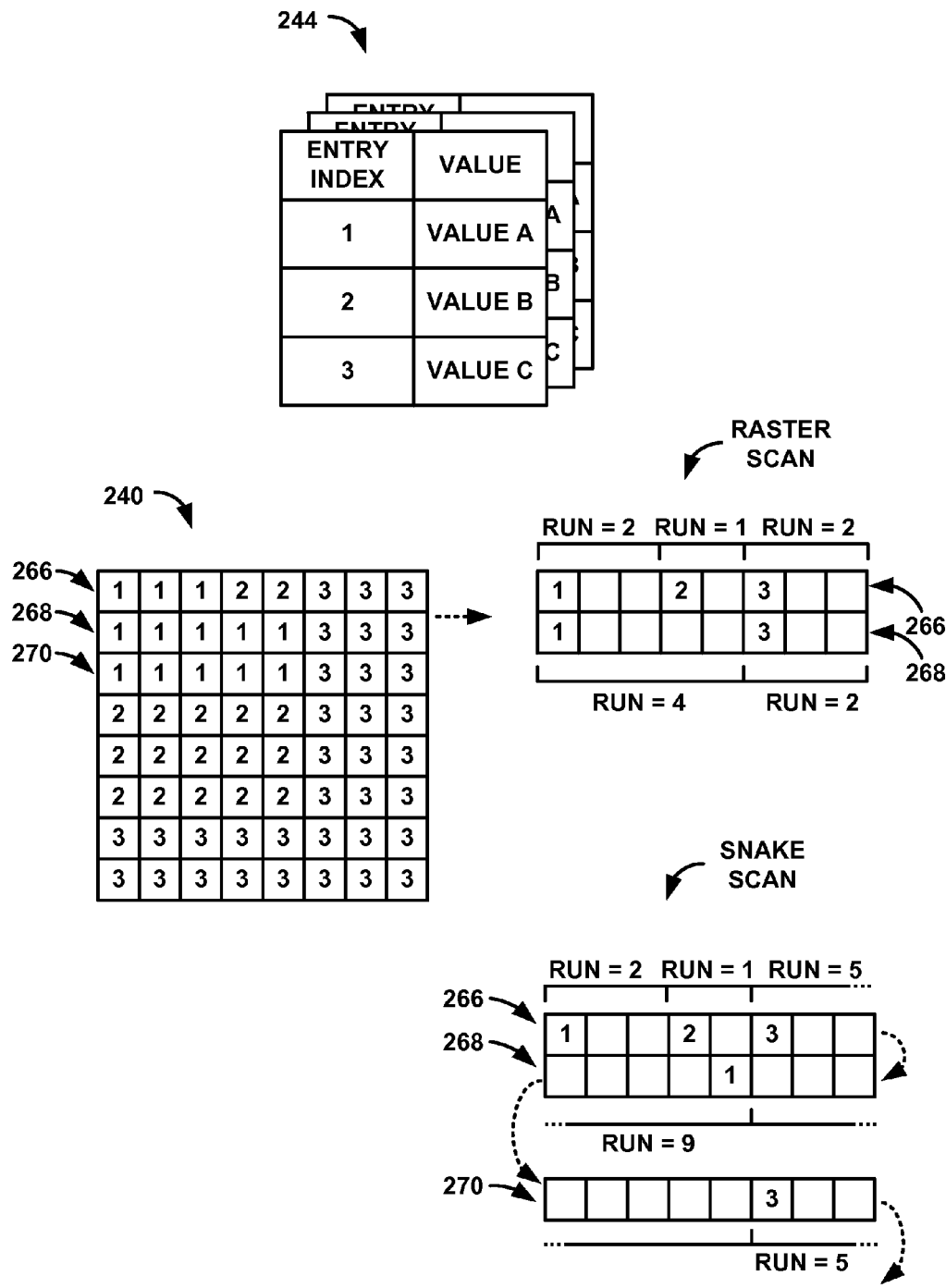
FIG. 5 is a conceptual diagram illustrating an example of determining indices to a palette for a block of pixels, consistent with techniques of this disclosure.

FIG. 5 is a conceptual diagram illustrating an example of determining indices to a palette for a block of pixels, consistent with techniques of this disclosure. For example, FIG. 5 includes a map 240 of index values (values 1, 2, and 3) that relate respective positions of pixels associated with the index values to an entry of palettes 244. Palettes 244 may be determined in a similar manner as first palettes 184 and second palettes 192 described above with respect to FIG. 4.

Again, the techniques of FIG. 5 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

While map 240 is illustrated in the example of FIG. 5 as including an index value for each pixel position, it should be understood that in other examples, not all pixel positions may be associated with an index value relating the pixel value to an entry of palettes 244. That is, as noted above, in some examples, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with index values. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of one to indicate that the pixel value at the (i, j) location in the CU is one of the values in palettes 244. Video encoder 20 may, in such an example, also encode a palette index (shown in the example of FIG. 5 as values 1-3) to indicate that pixel value in the palette and to allow video decoder to reconstruct the pixel value. In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, video encoder 20 may encode one or more syntax elements indicating a number of consecutive pixels or index values in a given scan order that have the same pixel value or index value. As noted above, the string of like-valued pixel or index values may be referred to herein as a run. In an example for purposes of illustration, if two consecutive pixels or indices in a given scan order have different values, the run is equal to zero. If two consecutive pixels or indices in a given scan order have the same value but the third pixel or index in the scan order has a different value, the run is equal to one. For three consecutive indices or pixels with the same value, the run is two, and so forth. Video decoder 30 may obtain the syntax elements indicating a run from an encoded bitstream and use the data to determine the number of consecutive locations that have the same pixel or index value.

Video decoder 30 may receive the syntax elements described above and reconstruct rows 266, 268, and 270. For example, video decoder 30 may obtain, from an encoded bitstream, data indicating an index value for a position of map 240 currently being coded. Video decoder 30 may also obtain data indicating the number of consecutive positions in the scan order having the same index value.

Figure 6:
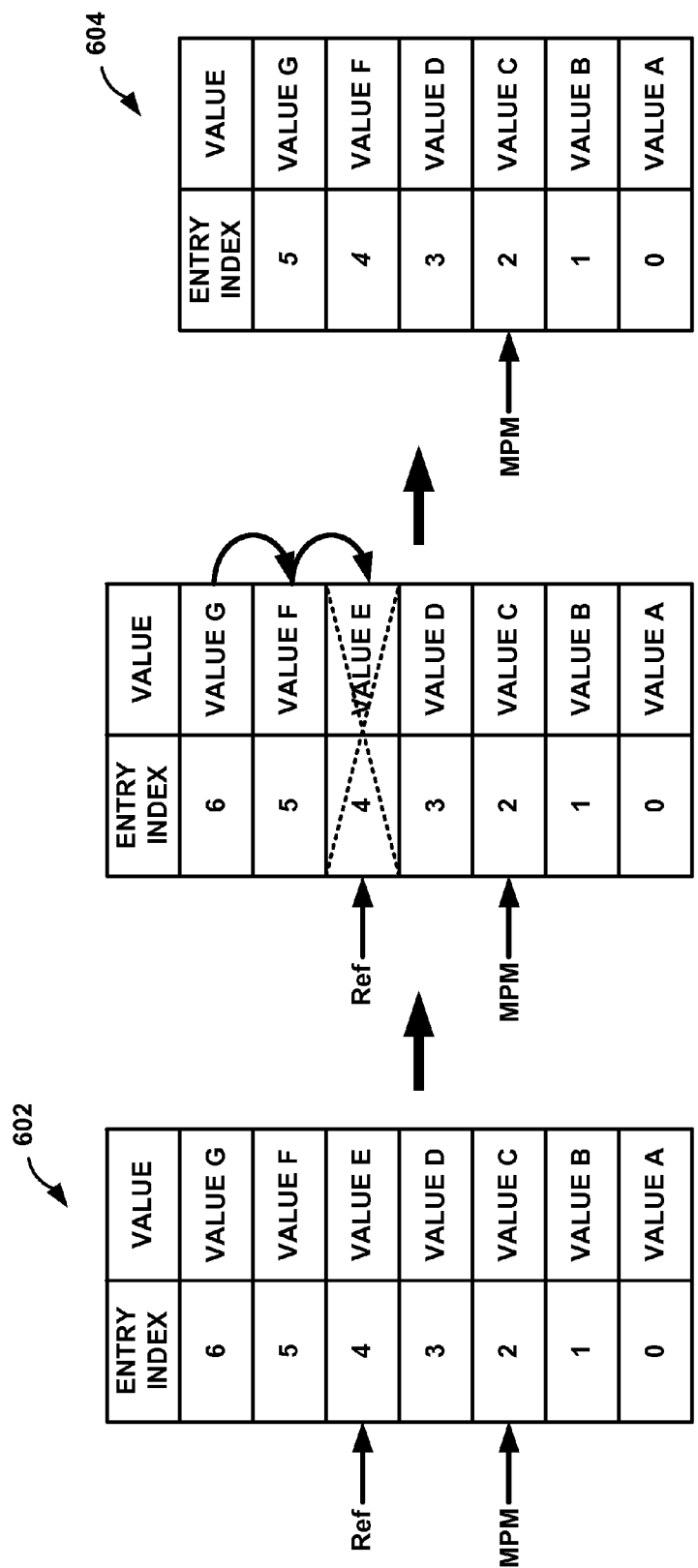
FIG. 6 is a conceptual diagram illustrating an example pruning operation to remove an index from a palette for a block of pixels, consistent with techniques of this disclosure.

FIG. 6 is a conceptual diagram illustrating an example pruning operation to remove an index from a palette for a block of pixels, consistent with techniques of this disclosure. The techniques of FIG. 6 may performed by a video coder, such as video encoder 20 of FIGS. 1 and 2 or video decoder 30 of FIGS. 1 and 3.

FIG. 6 includes palette 602, which may be determined in a similar manner as first palettes 184 and second palettes 192 described above with respect to FIG. 4. Palette 602 may include seven entries that each correspond to a color value. As shown in FIG. 6, entry index 0 may correspond to color value A, entry index 1 may correspond to color value B, entry index 2 may correspond to color value C, entry index 3 may correspond to color value D, entry index 4 may correspond to color value E, entry index 5 may correspond to color value F, and entry index 6 may correspond to color value G.

As discussed above, a palette-based coding unit of a video coder (e.g., palette-based encoding unit 122 of video encoder 20 or palette-based decoding unit 165 of video decoder 30) may determine, for a current pixel of the current block of video data, a particular entry in a palette that is predicted to correspond to a color value of the current pixel. In the example of FIG. 6, the palette-based coding unit may determine that entry 2 of palette 602 is predicted to correspond to a color value of the current pixel (i.e., the current pixel is predicted to have color value C). As such, entry 2 of palette 602 is marked as the most-probable-mode (MPM).

As discussed above, a palette-based coding unit may perform a pruning operation to generate an adjusted palette when encoding a palette index value for a current pixel of a current block. To generate the adjusted palette for the current pixel, the palette-based coding unit may remove one or more entries from the palette for the current block that cannot be the palette index value for the current pixel. For instance, if the current pixel is not the first pixel within the current block in the scanning order and the last coded pixel in the scanning order is a non-escape pixel, the palette-based coding unit may apply the following procedures the current pixel palette index T.

First, if there is no escape pixel in the current block, the palette-based coding unit may set a variable maxSymbol equal to the current block palette size. Alternatively, if there is at least one escape pixel in the current block, the palette-based coding unit may set the variable maxSymbol equal to the current block palette size plus 1 if the current block may have escape pixel. For purposes of the example of FIG. 6, the current block does not contain any escape pixels. As such, in the example of FIG. 6, the palette-based coding unit may set maxSymbol equal to the current block palette size, which is seven (i.e., maxSymbol=7).

The palette-based coding unit may determine whether the palette includes one or more entries that cannot be the palette index value for the current pixel. As one example, if the last coded neighboring pixel of the current pixel in scanning order is coded in "index" mode, the palette-based coding unit may determine that the current pixel palette index T cannot be equal to the last coded neighboring pixel's index. In such examples, the palette-based coding unit may set a variable Ref equal to the index value of the last coded neighboring pixel. As another example, if the current pixel is at the non-first row, and the last coded neighboring pixel in scanning order is "copy above" mode and the pixel above the current pixel is non-escape, the palette-based coding unit may determine that the current pixel palette index T cannot be equal to index of the above pixel. In such examples, the palette-based coding unit may set a variable Ref equal to the index value of the above pixel. In either example, the palette-based coding unit may decrement maxSymbol (i.e., set maxSymbol equal to (maxSymbol−1)), and, if the current pixel palette index T is larger than Ref the palette-based coding unit may decrement the current pixel palette index T (i.e., set the current index T equal to (T−1)).

In the example of FIG. 6, the palette-based coding unit may determine that entry index 4 of palette 602 cannot be the palette index value for the current pixel. Based on the determination, the palette-based coding unit may set Ref equal to index 4, and remove index 4 from palette 602, decrement the index values of entry indexes larger than Ref (i.e., set entry index 4 to correspond to color value F, and entry index 5 may correspond to color value G), and decrement maxSymbol (i.e., maxSymbol=maxSymbol−1=6) to generate adjusted palette 604 for the current pixel.

By removing one or more entries from the palette for the current block, the palette-based coding unit may reduce the range of possible indices which may be signaled for the current block. For instance, as shown in FIG. 6, as opposed to the range of possible indices being from 0 to 6, the adjusted range is from 0 to 5. In this way, the palette-based coding unit may reduce the amount of data used to signal the palette index for the current block.

Figure 7:
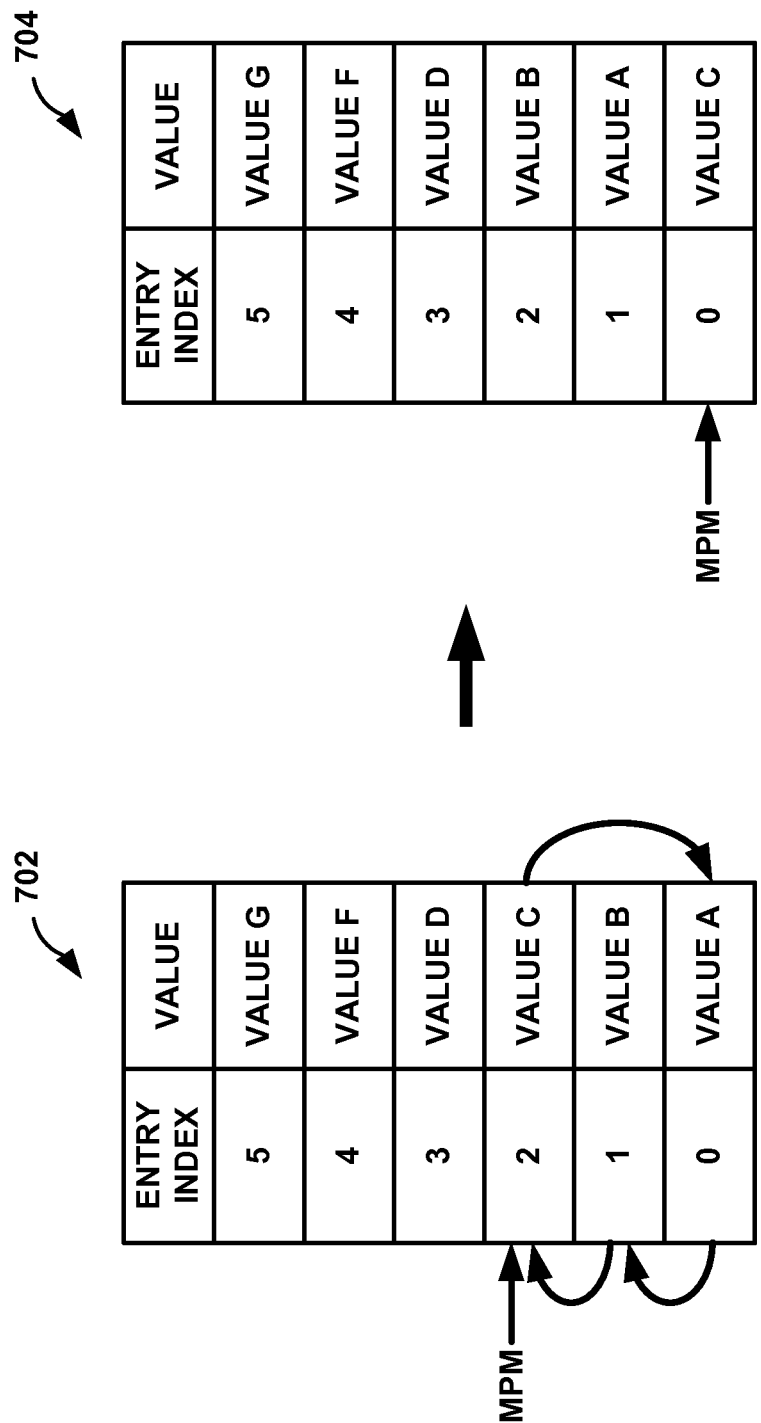
FIG. 7 is a conceptual diagram illustrating an example operation to reorder indices within a palette for a block of pixels, consistent with techniques of this disclosure.

FIG. 7 is a conceptual diagram illustrating an example operation to reorder indices within a palette for a block of pixels, consistent with techniques of this disclosure. The techniques of FIG. 7 may performed by a video coder, such as video encoder 20 of FIGS. 1 and 2 or video decoder 30 of FIGS. 1 and 3.

FIG. 7 includes palette 702, which may represent an adjusted palette, such as adjusted palette 604 of FIG. 6. Palette 702 may include six entries that each correspond to a color value. As shown in FIG. 7, entry index 0 may correspond to color value A, entry index 1 may correspond to color value B, entry index 2 may correspond to color value C, entry index 3 may correspond to color value D, entry index 4 may correspond to color value F, and entry index 5 may correspond to color value G.

As discussed above, a palette-based coding unit of a video coder (e.g., palette-based encoding unit 122 of video encoder 20 or palette-based decoding unit 165 of video decoder 30) may reorder the entries in a palette such that the predicted index value is the first entry in the palette (i.e., such that a value of the particular entry is less than values of other entries in the palette). For instance, as shown in FIG. 7 where the predicted index (MPM) is index 2, the palette-based coding unit may move the value associated with index 2 to index 0 and increment the indices of entries less than the predicted index by one (i.e., move value A from index 0 to index 1, and move value B from index 1 to index 2) to generate reordered palette 704. As such, when the palette-based coding unit codes the predicted index value using variable length codes, the predicted index value will have the shortest possible code length. In this way, the palette-based coding unit may reduce the amount of data used to represent a palette index.

In some examples, the palette-based coding unit may always reorder the entries in the palette such that the predicted index value is the first entry in the palette. In some examples, the palette-based coding unit may never reorder the entries in the palette such that the predicted index value is the first entry in the palette. In some examples, the palette-based coding unit may reorder the entries in the palette such that the predicted index value is the first entry in the palette under certain conditions. As one example, the palette-based coding unit may reorder the entries in the palette such that the predicted index value is the first entry in the palette where a number of entries in the palette (or the adjusted palette) is less than a threshold, such as the predefined threshold discussed above that may be used by the palette-based coding unit to select the binarization. For instance, if the threshold is seven and the number of entries in the palette is six, the palette-based coding unit may reorder the entries in the palette such that the predicted index value is the first entry in the palette. As another example, the palette-based coding unit may reorder the entries in the palette such that the predicted index value is the first entry in the palette where a number of entries in the palette (or the adjusted palette) is greater than or equal to a threshold, such as the predefined threshold discussed above that may be used by the palette-based coding unit to select the binarization. For instance, if the threshold is four and the number of entries in the palette is six, the palette-based coding unit may reorder the entries in the palette such that the predicted index value is the first entry in the palette.

Figure 8:
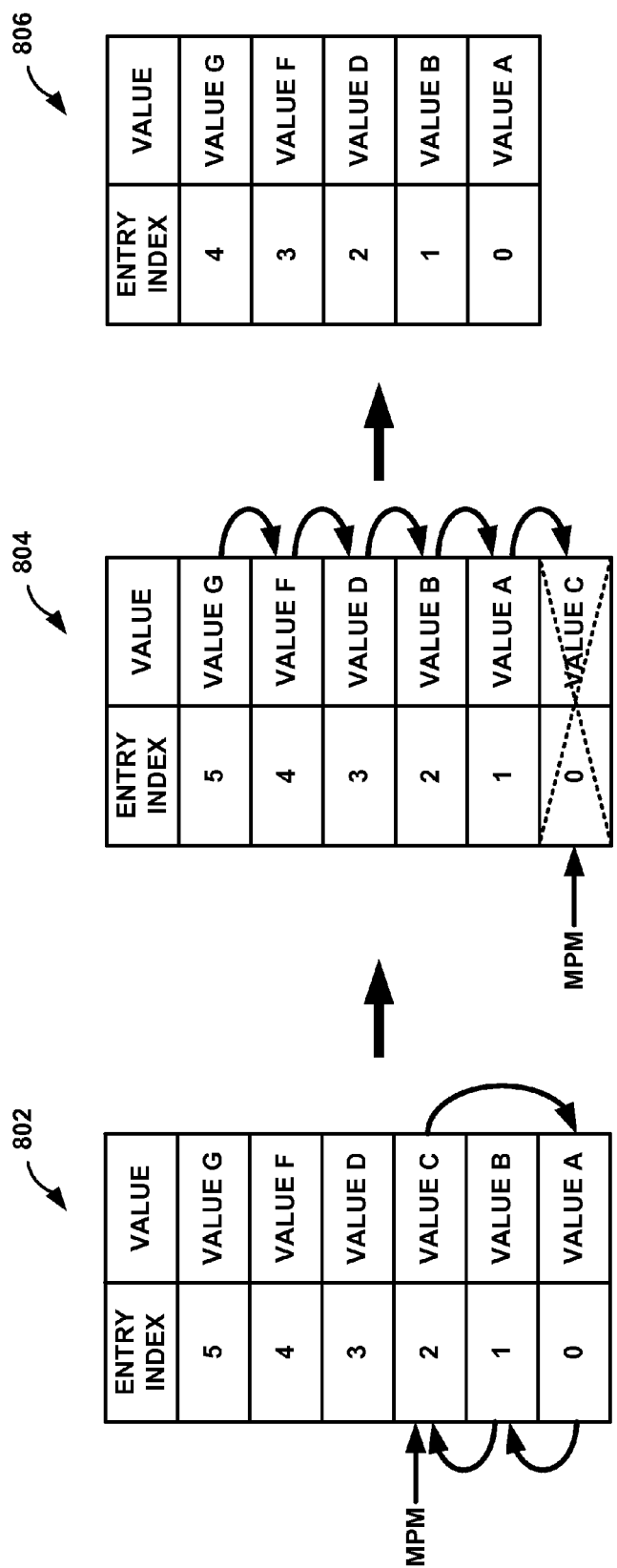
FIG. 8 is a conceptual diagram illustrating an example operation to reorder indices within and remove an index from a palette for a block of pixels, consistent with techniques of this disclosure.

FIG. 8 is a conceptual diagram illustrating an example operation to reorder indices within and remove an index from a palette for a block of pixels, consistent with techniques of this disclosure. The techniques of FIG. 8 may performed by a video coder, such as video encoder 20 of FIGS. 1 and 2 or video decoder 30 of FIGS. 1 and 3.

FIG. 8 includes palette 802, which may represent an adjusted palette, such as adjusted palette 604 of FIG. 6. Palette 802 may include six entries that each correspond to a color value. As shown in FIG. 8, entry index 0 may correspond to color value A, entry index 1 may correspond to color value B, entry index 2 may correspond to color value C, entry index 3 may correspond to color value D, entry index 4 may correspond to color value F, and entry index 5 may correspond to color value G.

As discussed above, a palette-based coding unit of a video coder (e.g., palette-based encoding unit 122 of video encoder 20 or palette-based decoding unit 165 of video decoder 30) may reorder the entries in a palette such that the predicted index value is the first entry in the palette (i.e., such that a value of the particular entry is less than values of other entries in the palette). For instance, as shown in FIG. 8 where the predicted index (MPM) is index 2, the palette-based coding unit may move the value associated with index 2 to index 0 and increment the indices of entries less than the predicted index by one (i.e., move value A from index 0 to index 1, and move value B from index 1 to index 2) to generate reordered palette 804.

As also discussed above, where the palette index value is not equal to the prediction index, the palette-based coding unit may perform a pruning operation by removing the prediction index from the palette for the current pixel and code the palette index value for the current pixel among the remaining possible indices. In the example of FIG. 8 where the prediction index is reordered to index 0, if the palette index value for the current pixel is actually two (i.e., the color of the current pixel is value B), the palette-based coding unit may remove the prediction index and decrement the remaining indices to generate reordered and adjusted palette 806.

Figure 9:
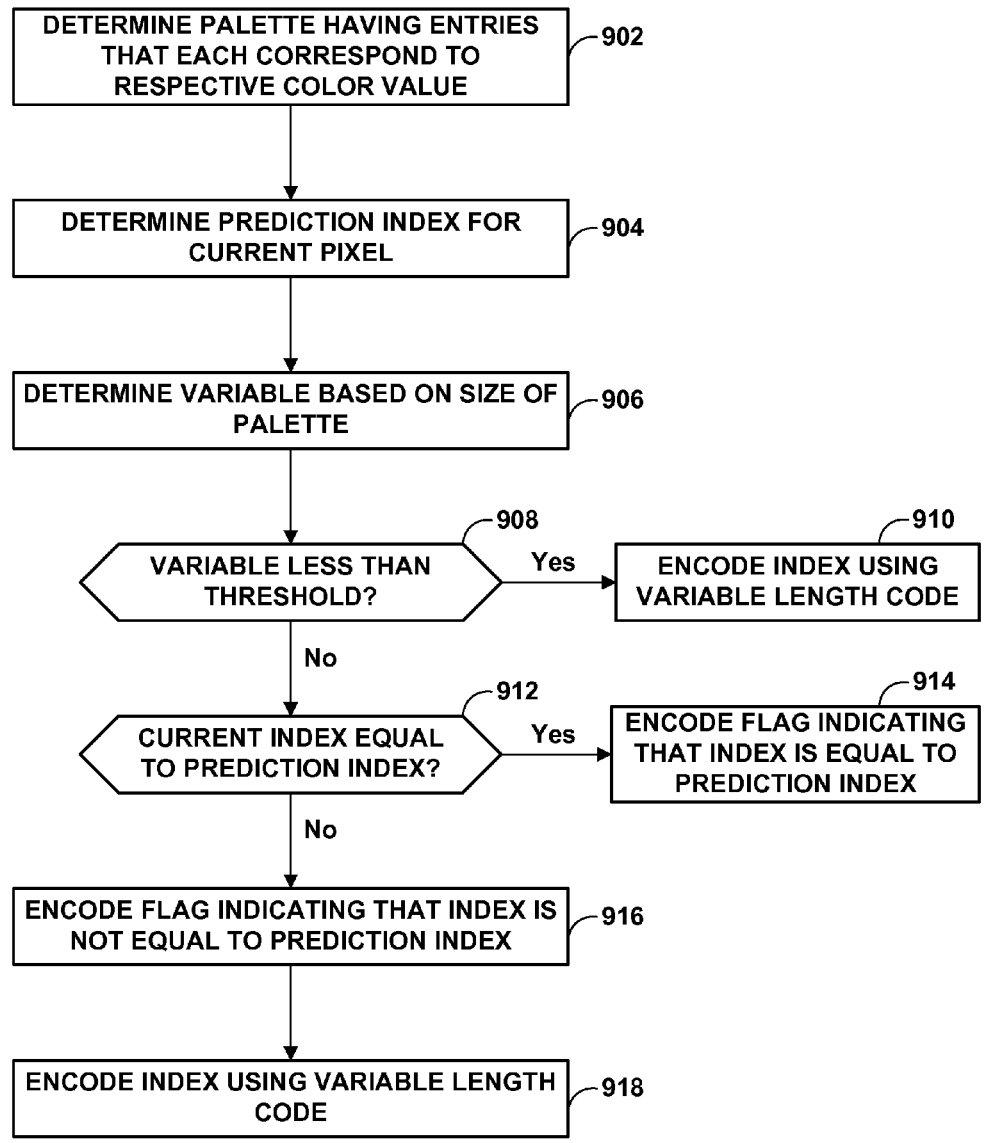
FIG. 9 is a flowchart illustrating an example process for encoding an index for a pixel of a block of video data, consistent with techniques of this disclosure.

FIG. 9 is a flowchart illustrating an example process for encoding an index for a pixel of a block of video data, consistent with techniques of this disclosure. The techniques of FIG. 9 may be performed by a video coder, such as video encoder 20 illustrated in FIG. 1 and FIG. 2. For purposes of illustration, the techniques of FIG. 9 are described within the context of video encoder 20 of FIG. 1 and FIG. 2, although video coders having configurations different than that of video encoder 20 may perform the techniques of FIG. 9.

As discussed above, video encoder 20 may perform palette-based encoding to encode a current block of video data. For example, palette-based encoding unit 122 of video encoder 20 may determine a palette having a plurality of entries that each correspond to a respective color value (902), generate a mapping between pixels of the current block of video data and indices of entries in the palette, and encode the indices of the map. Palette-based encoding unit 122 may use several different techniques to code index values of the map, sometimes coding index values of the map relative to other indices of the map. For instance, palette-based encoding unit 122 may use index mode, copy above mode, and transition mode to code index values of the map relative to other indices of the map. In some examples, while coding the index values, palette-based encoding unit 122 may store information regarding transitions between index values. For instance, palette-based encoding unit 122 may maintain a table, referred to as a transition table, that includes the following index value for the last occurrence of a given index value. Palette-based encoding unit 122 may determine a prediction index for a current pixel (904). For instance, palette-based encoding unit 122 may determine a particular entry in the palette that is predicted to correspond to a color value of a current pixel of the current block of video data. In some examples, palette-based encoding unit 122 may determine the prediction index based on the transition table.

In accordance with one or more techniques of this disclosure, as opposed to using a single binarization to encode the index values, palette-based encoding unit 122 may select a binarization from a plurality of binarizations to use for encoding the current index value. In some examples, palette-based encoding unit 122 may select the binarization based on a size of the palette. For instance, palette-based encoding unit 122 may determine a variable based on a size of the palette (906). In some examples, the variable may be the size of the palette. In some examples, the variable may be the size of the palette after one or more adjustments are performed, such as the pruning operation described above with reference to FIG. 6.

Palette-based encoding unit 122 may determine whether the determined variable is less than a threshold (908). If the determined variable is less than the threshold ("Yes" branch of 908), palette-based encoding unit 122 may encode the current index value using a second binarization of the plurality of binarizations. For instance, palette-based encoding unit 122 may encode the current index value using variable length code (910). In some examples, palette-based encoding unit 122 may reorder the indices of the palette for the current pixel such that the entry corresponding to the prediction index for the current pixel is first in the palette.

If the determined variable is not less than the threshold ("No" branch of 908), palette-based encoding unit 122 may encode the current index value using a first binarization of the plurality of binarizations. For instance, palette-based encoding unit 122 may determine whether the current index is equal to the prediction index (912). If the current index is equal to the prediction index ("Yes" branch of 912), palette-based encoding unit 122 may encode a flag indicating that the index is equal to the prediction index (e.g., MPM_pred_flag=1) (914). If the current index is not equal to the prediction index ("No" branch of 912), palette-based encoding unit 122 may encode a flag indicating that the index is not equal to the prediction index (e.g., MPM_pred_flag=0) (916), and encode the current index value using variable length code (918). In some examples, where the current index is not equal to the prediction index, palette-based encoding unit 122 may remove the prediction index from the palette for the current pixel and encode the current index value among the remaining entries using variable length code.

Figure 10:
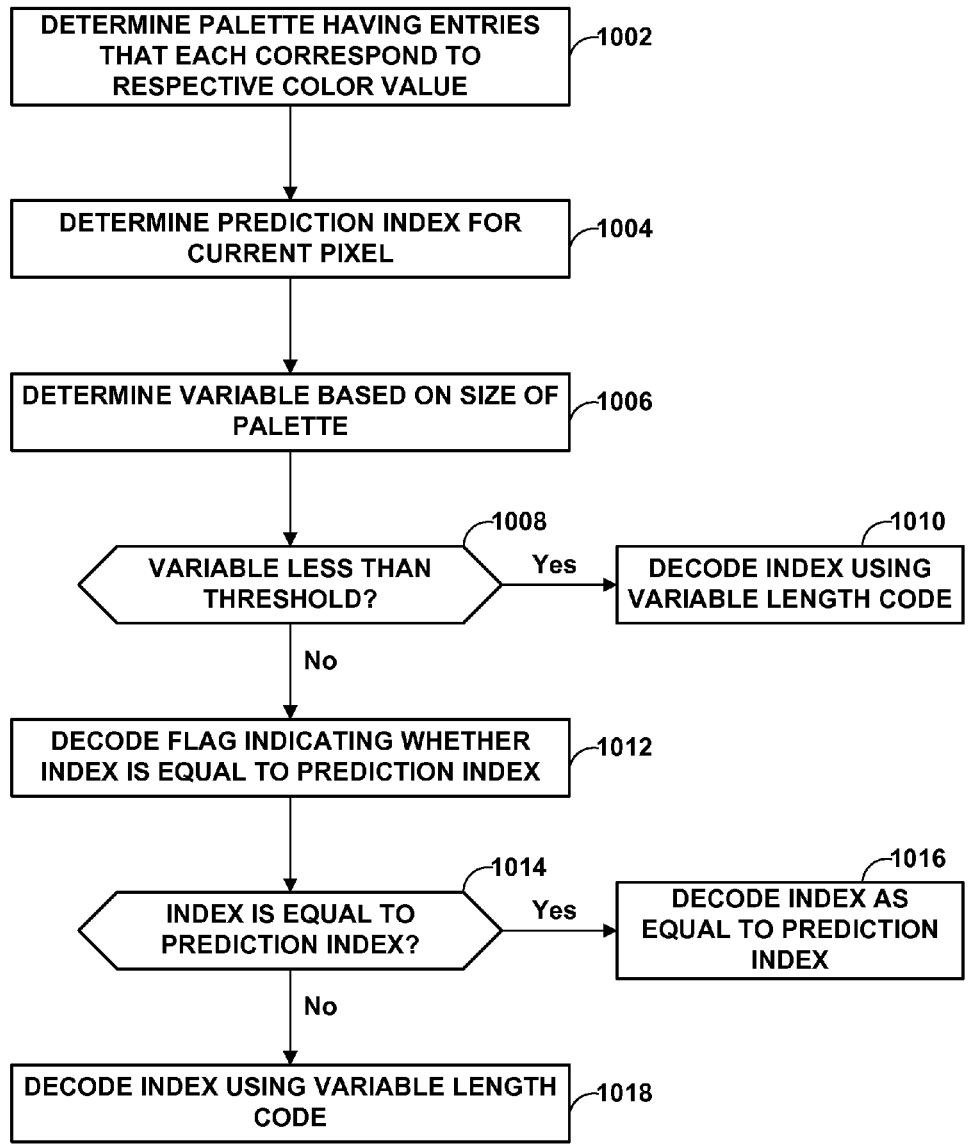
FIG. 10 is a flowchart illustrating an example process for decoding an index for a pixel of a block of video data, consistent with techniques of this disclosure.

FIG. 10 is a flowchart illustrating an example process for decoding an index for a pixel of a block of video data, consistent with techniques of this disclosure. The techniques of FIG. 10 may be performed by a video coder, such as video decoder 30 illustrated in FIG. 1 and FIG. 3. For purposes of illustration, the techniques of FIG. 10 are described within the context of video decoder 30 of FIG. 1 and FIG. 3, although video coders having configurations different than that of video decoder 30 may perform the techniques of FIG. 10.

As discussed above, video decoder 30 may perform palette-based decoding to decode a current block of video data. For example, palette-based decoding unit 165 of video decoder 30 may determine a palette having a plurality of entries that each correspond to a respective color value (1002), and decode the indices of a mapping between pixels of the current block of video data and indices of entries in the palette. Palette-based decoding unit 165 may use several different techniques to code index values of the map, sometimes coding index values of the map relative to other indices of the map. For instance, palette-based decoding unit 165 may use index mode, copy above mode, and transition mode to code index values of the map relative to other indices of the map. In some examples, while coding the index values, palette-based decoding unit 165 may store information regarding transitions between index values. For instance, palette-based decoding unit 165 may maintain a table, referred to as a transition table, that includes the following index value for the last occurrence of a given index value. Palette-based decoding unit 165 may determine a prediction index for a current pixel (1004). For instance, palette-based decoding unit 165 may determine a particular entry in the palette that is predicted to correspond to a color value of a current pixel of the current block of video data. In some examples, palette-based decoding unit 165 may determine the prediction index based on the transition table.

In accordance with one or more techniques of this disclosure, as opposed to using a single binarization to decode the index values, palette-based decoding unit 165 may select a binarization from a plurality of binarizations to use for decoding the current index value. In some examples, palette-based decoding unit 165 may select the binarization based on a size of the palette. For instance, palette-based decoding unit 165 may determine a variable based on a size of the palette (1006). In some examples, the variable may be the size of the palette. In some examples, the variable may be the size of the palette after one or more adjustments are performed, such as the pruning operation described above with reference to FIG. 6.

Palette-based decoding unit 165 may determine whether the determined variable is less than a threshold (1008). If the determined variable is less than the threshold ("Yes" branch of 1008), palette-based decoding unit 165 may decode the current index value using a second binarization of the plurality of binarizations. For instance, palette-based decoding unit 165 may decode the current index value using variable length code (1010). In some examples, palette-based decoding unit 165 may reorder the indices of the palette for the current pixel such that the entry corresponding to the prediction index for the current pixel is first in the palette.

If the determined variable is not less than the threshold ("No" branch of 1008), palette-based decoding unit 165 may decode a flag that indicates whether the current index is equal to the prediction index (e.g., MPM_pred_flag) (1012). If the flag that indicates that the current index is equal to the prediction index (e.g., MPM_pred_flag=1) ("Yes" branch of 1014), palette-based decoding unit 165 may decode the current index value as equal to the prediction index (1016) and that the color of the current pixel is the color in the palette associated with the prediction index. If the flag that indicates that the current index is not equal to the prediction index (e.g., MPM_pred_flag=0) ("No" branch of 1014), palette-based decoding unit 165 may decode the current index value using variable length code (1018), and determine that the color of the current pixel is the color in the palette associated with the decoded index value. In some examples, where the current index is not equal to the prediction index, palette-based decoding unit 165 may remove the prediction index from the palette for the current pixel and decode the current index value among the remaining entries using variable length code.

In some examples, palette-based decoding unit 165 may decode the current index, decPltIndex, using the following example technique. Palette-based decoding unit 165 may set a variable Ref equal to INT_MAX, and set a variable maxSymbol equal to the current block palette size. Palette-based decoding unit 165 may remove one or more entries from the palette for the current block that cannot be the palette index value for the current pixel. As one example, if the left pixel is "index" mode, the current pixel cannot be equal to the left pixel index and palette-based decoding unit 165 may set Ref equal to the index value of the left pixel, and set maxSymbolMinus1 equal to (maxSymbol−1). As another example, if the current pixel is at the non-first row/column, and the left pixel is "copy above" mode and the pixel above the current pixel is non-escape, the current pixel index cannot be equal to index of the above pixel and palette-based decoding unit 165 may set Ref equal to the index value of the left pixel, and set maxSymbolMinus1 equal to (maxSymbol−1).

If maxSymbolMinus1 is smaller than a threshold Thr, palette-based decoding unit 165 may use truncated binary code to decode symbol decPltSymbol given maxSymbolMinus1. If maxSymbolMinus1 is equal or larger than Thr, palette-based decoding unit 165 may use the combination of a flag and truncated binary code to decode decPltSymbol. For instance, palette-based decoding unit 165 may decode index prediction flag MPM_pred_flag, and set decPltSymbol equal to MPM_pred_flag. If MPM_pred_flag is equal to 1, palette-based decoding unit 165 may set maxSymbolMinus2 equal to (maxSymbolMinus1−1), use truncated binary code to decode symbol decPltSymbolRef given maxSymbolMinus2, and set decPltSymbol equal to (decPltSymbolRef+1).

If decPltSymbol is equal to 0, palette-based decoding unit 165 may set decPltIndex equal to MPM (i.e., the prediction index for the current pixel). If decPltSymbol is not equal to 0, palette-based decoding unit 165 may apply the following procedure: if Ref is not equal to INT_MAX and MPM is larger than Ref, palette-based decoding unit 165 may set a bMPMLargerThanRef flag equal to 1, otherwise palette-based decoding unit 165 may set the bMPMLargerThanRef flag equal 0. If either of the following two conditions are true, palette-based decoding unit 165 may set decPltSymbol equal to (decPltSymbol−1): 1) decPltSymbol is smaller than MPM, or 2) bMPMLargerThanRef is equal to 0 and decPltSymbol is equal to MPM. If Ref is not equal to INT_MAX and decPltSymbol is equal or larger than Ref, palette-based decoding unit 165 may set decPltSymbol equal to (decPltSymbol+1). Finally, palette-based decoding unit 165 may set the current palette index, decPltIndex, equal to decPltSymbol.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

As discussed above, a video coder may use truncated binary coding to code index values. Truncated binary coding is typically used for uniform probability distributions with a finite alphabet, although not used in the current HEVC. It is parameterized by an alphabet with total size of number n. It is a slightly more general form of binary encoding when n is not a power of two.

If n is a power of 2 then the coded value for 0≤x<n is the simple binary code for x of length log 2(n). Otherwise let k=floor(log 2(n)) such that 2k≤n<2k+1 and let u=2k+1−n.

Truncated binary coding assigns the first u symbols codewords of length k and then assigns the remaining n-u symbols the last n-u codewords of length k+1. Table 7 is an example for n=5.

TABLE 7

| Symbol | Bin string | | |
|--------|---|---|---|
| 0 | 0 | 0 | |
| 1 | 0 | 1 | |
| 2 | 1 | 0 | |
| 3 | 1 | 1 | 0 |
| 4 | 1 | 1 | 1 |
| binIdx | 0 | 1 | 2 |

Regardless which the binarization method, each bin can either be processed in the regular context coding mode or bypass mode. The bypass mode may be selected for selected bin in order to allow a speed up of the whole encoding (decoding) process.

The techniques described in this disclosure may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining, by a video coder and for a current block of video data, a palette that includes a plurality of entries that each corresponds to a respective color value;
   determining, by the video coder, a particular entry in the palette that is predicted to correspond to a color value of a current pixel of the current block of video data;
   selecting, by the video coder, a binarization from a plurality of palette index binarizations, wherein selecting the binarization comprises:
      determining a variable based on a size of the palette; and
      selecting the binarization from the plurality of palette index binarizations based on whether the variable satisfies a predefined threshold; and
   coding, by the video coder and using the selected binarization, a palette index that indicates which entry in the palette corresponds to a color value for a current pixel of the current block of video data, wherein coding the palette index using a first binarization of the plurality of palette index binarizations comprises coding a syntax element that indicates whether the palette index is equal to the particular entry, and wherein coding the palette index using a second binarization of the plurality of palette index binarizations comprises coding the palette index using a variable length code without coding the syntax element.

2. The method of claim 1, wherein coding the palette index using the first binarization further comprises:
   coding, where the palette index is not equal to the particular entry, the palette index using the variable length code.

3. The method of claim 1, wherein the variable is further determined based on whether the current block includes escape pixels, a coding mode of a last coded neighboring pixel of the current pixel in a scan order, and whether the current pixel is in a first row in the scan order.

4. The method of claim 1, wherein the predefined threshold is signaled at one or more of: a slice level, a picture level, or a sequence level, or is a constant known by both an encoder and a decoder.

5. The method of claim 1, wherein selecting the binarization from the plurality of palette index binarizations based on whether the variable satisfies the threshold comprises:
   selecting the first binarization from the plurality of palette index binarizations where the variable is greater than or equal to the predefined threshold; and
   selecting the second binarization from the plurality of palette index binarizations where the variable is less than the predefined threshold.

6. The method of claim 1, wherein selecting the binarization from the plurality of palette index binarizations comprises:
   coding, for the current block of video data, a syntax element that indicates the selected binarization.

7. The method of claim 1, further comprising:
   reordering the entries in the palette such that a value of the particular entry is less than values of other entries in the palette.

8. The method of claim 1, further comprising:
   coding, for the current block of video data, a syntax element that indicates whether transition mode is enabled for the current block.

9. The method of claim 1, further comprising:
   coding, by the video coder and for respective pixels of the current block, a respective syntax element that indicates a mode of a plurality of modes used to predict the color value for the respective pixel, wherein the plurality of modes includes an index mode, a transition copy mode, and a copy above mode, and wherein a single bit differentiates a binarization of the syntax element when the index mode is used and a binarization of the syntax element when the transition mode is used.

10. The method of claim 1, wherein determining the palette comprises determining whether the palette for the current block of video data is predicted from a palette for a previously coded block of video data, and wherein the particular entry in the palette that is predicted to correspond to the color value of the current pixel is determined based on a transition table for the current block, the method further comprising:
    responsive to determining that the palette for the current block is predicted from the palette for a previously coded block of video data, predicting the transition table for the current block from a transition table for the previously coded block of video data.

11. The method of claim 1, wherein the particular entry in the palette that is predicted to correspond to the color value of the current pixel is determined based on a transition table for the current block, the method further comprising:
    coding a syntax element that indicates whether the transition table for the current block is inherited from a transition table for a previously coded block of video data.

12. The method of claim 1, the method being executable on a wireless communication device, wherein the device comprises:
    a memory a memory configured to store video data; and
    a processor configured to execute instructions to process the video data stored in said memory, wherein the device further comprises one or both of:
    a transmitter configured to transmit the coded palette index; and
    a receiver configured to receive the coded palette index.

13. The method of claim 12, wherein the wireless communication device is a cellular telephone and the transmitter and/or the receiver is configured to modulate the coded palette index according to a cellular communication standard.

14. A video coding device comprising:
a memory configured to store video data;
one or more processors configured to:
determine, for a current block of video data, a palette that includes a plurality of entries that each corresponds to a respective color value;
determine a particular entry in the palette that is predicted to correspond to a color value of a current pixel of the current block of video data;
select a binarization from a plurality of palette index binarizations, wherein, to select the binarization from the plurality of palette index binarizations, the one or more processors are configured to:
determine a variable based on a size of the palette; and
select the binarization from the plurality of palette index binarizations based on whether the variable satisfies a predefined threshold; and
code, using the selected binarization, a palette index that indicates which entry in the palette corresponds to a color value for a current pixel of the current block of video data, wherein, to code the palette index using a first binarization of the plurality of palette index binarizations, the one or more processors are configured to code a syntax element that indicates whether the palette index is equal to the particular entry, and wherein, to code the palette index using a second binarization of the plurality of palette index binarizations, the one or more processors are configured to code the palette index using a variable length code without coding the syntax element.

15. The video coding device of claim 14, wherein, to code the palette index using the first binarization, the one or more processors are further configured to:
code, where the palette index is not equal to the particular entry, the palette index using the variable length code.

16. The video coding device of claim 14, wherein the variable is further determined based on whether the current block includes escape pixels, a coding mode of a last coded neighboring pixel of the current pixel in a scan order, and whether the current pixel is in a first row in the scan order.

17. The video coding device of claim 14, wherein the predefined threshold is signaled at one or more of: a slice level, a picture level, or a sequence level, or is a constant known by both an encoder and a decoder.

18. The video coding device of claim 14, wherein, to select the binarization from the plurality of palette index binarizations based on whether the variable satisfies the threshold, the one or more processors are configured to:
select the first binarization from the plurality of palette index binarizations where the variable is greater than or equal to the predefined threshold; and
select the second binarization from the plurality of palette index binarizations where the variable is less than the predefined threshold.

19. The video coding device of claim 14, wherein, to select the binarization from the plurality of palette index binarizations, the one or more processors are configured to:
code, for the current block of video data, a syntax element that indicates the selected binarization.

20. The video coding device of claim 14, wherein the one or more processors are further configured to:
reorder the entries in the palette such that a value of the particular entry is less than values of other entries in the palette.

21. The video coding device of claim 14, wherein the one or more processors are further configured to:
code, for the current block of video data, a syntax element that indicates whether transition mode is enabled for the current block.

22. The video coding device of claim 14, wherein the one or more processors are further configured to:
code, by the video coder and for respective pixels of the current block, a respective syntax element that indicates a mode of a plurality of modes used to predict the color value for the respective pixel, wherein the plurality of modes includes an index mode, a transition copy mode, and a copy above mode, and wherein a single bit differentiates a binarization of the syntax element when the index mode is used and a binarization of the syntax element when the transition mode is used.

23. The video coding device of claim 14, wherein, to determine the palette, the one or more processors are configured to determine whether the palette for the current block of video data is predicted from a palette for a previously coded block of video data, wherein the particular entry in the palette that is predicted to correspond to the color value of the current pixel is determined based on a transition table for the current block, and wherein the one or more processors are further configured to:
responsive to determining that the palette for the current block is predicted from the palette for a previously coded block of video data, predict the transition table for the current block from a transition table for the previously coded block of video data.

24. The video coding device of claim 14, wherein the particular entry in the palette that is predicted to correspond to the color value of the current pixel is determined based on a transition table for the current block, and wherein the one or more processors are further configured to:
code a syntax element that indicates whether the transition table for the current block is inherited from a transition table for a previously coded block of video data.

25. The video coding device of claim 14, wherein the video coding device is a wireless communication device, further comprising one or both of:
a transmitter configured to transmit the coded palette index; and
a receiver configured to receive the coded palette index.

26. The device of claim 25, wherein the wireless communication device is a cellular telephone and the transmitter and/or the receiver is configured to modulate the coded palette index according to a cellular communication standard.

27. A video coding device comprising:
means for determining, for a current block of video data, a palette that includes a plurality of entries that each corresponds to a respective color value;
means for determining a particular entry in the palette that is predicted to correspond to a color value of a current pixel of the current block of video data;
means for selecting a binarization from a plurality of palette index binarizations, wherein the means for selecting the binarization comprise:
means for determining a variable based on a size of the palette; and
means for selecting the binarization from the plurality of palette index binarizations based on whether the variable satisfies a predefined threshold; and
means for coding, using the selected binarization, a palette index that indicates which entry in the palette corresponds to a color value for a current pixel of the current block of video data, wherein the means for coding the palette index using a first binarization of the plurality of palette index binarizations comprise means for coding a syntax element that indicates whether the palette index is equal to the particular entry, and wherein the means for coding the palette index using a second binarization of the plurality of palette index binarizations comprise means for coding the palette index using a variable length code without coding the syntax element.

28. A non-transitory computer-readable storage medium storing instructions that, when executed, cause one or more processors of a video coding device to:

determine, for a current block of video data, a palette that includes a plurality of entries that each corresponds to a respective color value;

determine a particular entry in the palette that is predicted to correspond to a color value of a current pixel of the current block of video data;

select a binarization from a plurality of palette index binarizations, wherein the instructions that cause the one or more processors to select the binarization comprise instructions that cause the one or more processors to:

determine a variable based on a size of the palette; and select the binarization from the plurality of palette index binarizations based on whether the variable satisfies a predefined threshold; and code, using the selected binarization, a palette index that indicates which entry in the palette corresponds to a color value for a current pixel of the current block of video data, wherein the instructions that cause the one or more processors to code the palette index using a first binarization of the plurality of palette index binarizations comprise instructions that cause the one or more processors to code a syntax element that indicates whether the palette index is equal to the particular entry, and wherein the instructions that cause the one or more processors to code the palette index using a second binarization of the plurality of palette index binarizations comprise instructions that cause the one or more processors to code the palette index using a variable length code without coding the syntax element.

* * * * *